(12) United States Patent
Colby

(10) Patent No.: US 8,806,138 B1
(45) Date of Patent: Aug. 12, 2014

(54) DYNAMIC DEPENDENCIES AND PARAMETERIZATIONS FOR EXECUTION AND CACHING

(75) Inventor: Christopher Colby, Piedmont, CA (US)

(73) Assignee: Pixar, Emeryville, CA (US)

( * ) Notice: Subject to any disclaimer, the term of this patent is extended or adjusted under 35 U.S.C. 154(b) by 190 days.

(21) Appl. No.: 13/436,685

(22) Filed: Mar. 30, 2012

Related U.S. Application Data

(62) Division of application No. 12/032,772, filed on Feb. 18, 2008, now abandoned.

(60) Provisional application No. 60/890,806, filed on Feb. 20, 2007.

(51) Int. Cl.
*G06F 12/08* (2006.01)

(52) U.S. Cl.
CPC ........ *G06F 12/0808* (2013.01); *G06F 12/0817* (2013.01); *G06F 12/0824* (2013.01)
USPC ........... 711/133; 711/113; 711/119; 711/141; 711/144; 711/154; 711/156

(58) Field of Classification Search
CPC ............ G06F 12/0808; G06F 12/0817; G06F 12/0824
USPC .......... 711/113, 119, 141, 144, 154, 156, 133
See application file for complete search history.

(56) References Cited

U.S. PATENT DOCUMENTS

| | | | | |
|---|---|---|---|---|
| 5,301,290 A | * | 4/1994 | Tetzlaff et al. | 711/142 |
| 5,551,005 A | * | 8/1996 | Sarangdhar et al. | 711/145 |
| 5,623,629 A | * | 4/1997 | Suzuki | 711/141 |
| 5,793,374 A | | 8/1998 | Guenter et al. | |
| 5,900,015 A | * | 5/1999 | Herger et al. | 711/141 |
| 6,199,144 B1 | * | 3/2001 | Arora et al. | 711/145 |
| 6,944,721 B2 | * | 9/2005 | Arimilli et al. | 711/146 |
| 6,950,908 B2 | * | 9/2005 | Shibayama et al. | 711/144 |
| 7,194,587 B2 | * | 3/2007 | McCalpin et al. | 711/144 |
| 7,395,381 B2 | * | 7/2008 | Mattina | 711/146 |
| 2003/0076328 A1 | | 4/2003 | Beda et al. | |
| 2004/0227762 A1 | | 11/2004 | Colby | |
| 2006/0277347 A1 | | 12/2006 | Ashmore et al. | |

OTHER PUBLICATIONS

Christopher Colby; "Dynamic Dependencies and Parameterizations for Execution and Caching"; U.S. Appl. No. 12/032,772, filed Feb. 18, 2008.

* cited by examiner

*Primary Examiner* — Stephen Elmore
(74) *Attorney, Agent, or Firm* — Patterson & Sheridan, LLP

(57) ABSTRACT

Data values are cached by dynamically determining the dependencies of computation nodes on input parameters and on other results of computation nodes. Cache data structures are maintained for computation nodes. When a node accesses a parameter, the parameter and its current value are added to the node's cache data structure. The cache data structure stores the result value of the computation node. When one computation node calls another node, the parameters and parameter values accessed by the second computation node may be added to the first and second computation nodes' cache data structures. When a computation node is called with parameter values, the cache data structure of the computation node is searched for a cached result value corresponding to at least a portion of the parameter values. If a cached result value is not found, the computation node is executed to determine and optionally cache the result value.

26 Claims, 31 Drawing Sheets

ENTER NODE F

NODE F CALLS NODE G

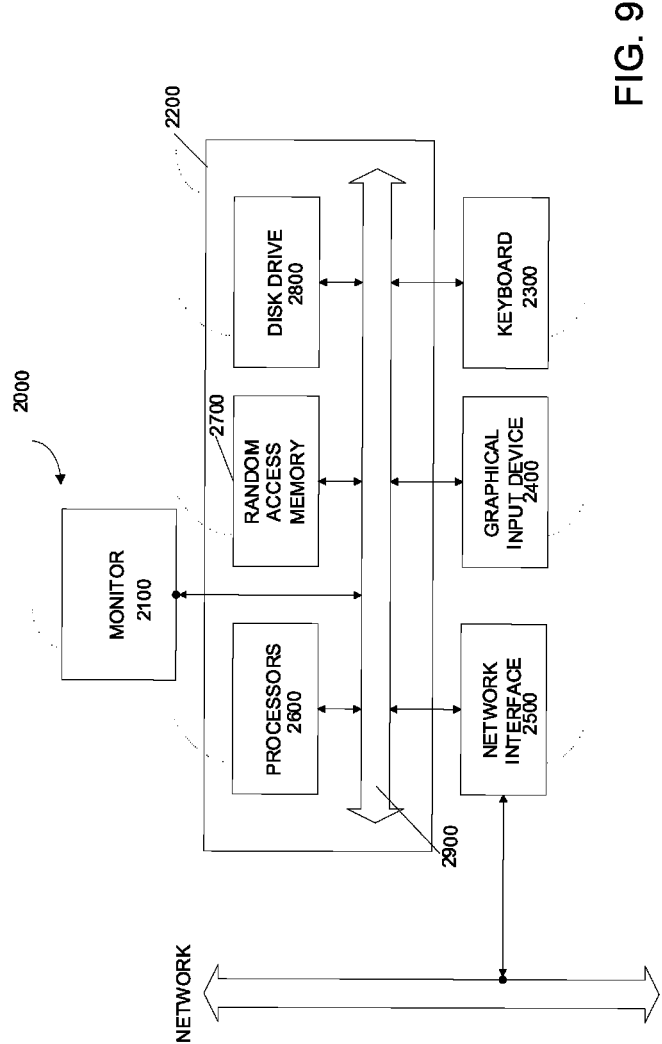

DYNAMIC DEPENDENCIES AND PARAMETERIZATIONS FOR EXECUTION AND CACHING

CROSS-REFERENCE TO RELATED APPLICATIONS

This application is a Divisional of U.S. patent application Ser. No. 12/032,772, filed Feb. 18, 2008 now abandoned and which claims priority to U.S. Provisional Patent Application No. 60/890,806, filed Feb. 20, 2007, both of which are incorporated by reference herein in their entirety.

BACKGROUND OF THE INVENTION

The present invention relates to the field of optimizing data processing by caching. Data processing routines can include programs, scripts, modules, functions, procedures, subroutines, executable data objects, or any other combination of one or more instructions adapted to be executed by a computer or other information processing device to determine a value of one or more data outputs. These data processing routines are referred to herein as computation nodes.

Computation nodes often, but not always, use the values of one or more data inputs, referred to as parameters, to determine their data outputs. When a computation node relies on a parameter to determine an output value, the computation node is said to be parameterized by this parameter.

A computation node can call or execute one or more additional computation nodes to provide intermediate data values used to determine its data outputs. When a first computation node calls a second computation node to determine an intermediate data value, the first computation node is said to be dependent on the second computation node.

In some systems, the number, type, and/or identity of input parameters provided to a computation nodes cannot be determined in advance of the system executing. These systems are said to have dynamic parameterization because the input parameters of computation nodes are determined during execution. Dynamic parameterization allows computation nodes to be adapted to many different contexts at runtime without requiring recompilation. For example, a computation node may be used to interpolate between two input parameter values. In one context, a user at runtime can request that this example computation node be used to interpolate the motion of a computer graphics object based on input parameters representing time. In another context, a user at runtime can request that this example computation node be used to interpolate to shading of a computer graphics object based on input parameters representing color.

Caching can be used to increase the execution speed of computation nodes. Memoization is one caching approach that stores the data output of a computation node and its corresponding input parameter values each time the computation node is called. When the computation node is called again with the same input parameter values, the data output value is retrieved from the cache, rather than executing the computation node (and any dependent computation nodes) again.

In some systems, caching uses static dependencies to determine when cached data is valid or invalid. For example, a programmer may manually specify that a computation node is dependent on a time input parameter. In this example, the computation node values are stored in a cache based on their corresponding time values. For example, a computation node can cache a first output value for time $t=1$ and a second output value for time $t=2$.

However, if a computation node is used in a different context, for example to interpolate between two colors, rather than between two times, then the static dependency defined by the programmer will be incorrect. For example, if a computation node interpolates between color c='red' and color c='blue', then the cache for this computation node should cache output values based on the color parameter, not the time parameter. If the computation node is statically dependent on the time parameter, not the color parameter, then the data cache may often provide an incorrect result if the computation node is used in a context different from its static dependency. Even when the data cache can provide a correct result, the data cache will require substantial storage and provide little or no improvement in performance.

In contrast, some systems allow for the dependencies to be determined dynamically. This allows systems to determine which computation nodes need to be recomputed and which computation nodes have still have valid data when input parameters are changed. However, these systems do not allow for dynamic parameterization of computation nodes, which limits the reuse and rearrangement of computation nodes at runtime.

Thus, there is an unmet need for a system and method to efficiently cache data values in systems that include dynamic parameterization of computation nodes. There is further an umet need for the system and method to dynamically determine the input parameter dependencies of computation nodes. There is also an unmet need for the system and method determine when cached data is invalid due to changes in computation nodes.

BRIEF SUMMARY OF THE INVENTION

An embodiment of the invention efficiently caches data values by dynamically determining the dependencies of computation nodes on input parameters and the dependencies of computation nodes on other computation nodes. An embodiment of the invention maintains cache data structures for computation nodes. When a computation node accesses a parameter, the parameter and its current value are added to the computation node's cache data structure. The cache data structure stores the result value of the computation node using a reference to the parameters and parameter values accessed during the determination of the result value.

In an embodiment, a first computation node can call a second computation node. The parameters and parameter values accessed by the second computation node may be added to the first and second computation nodes' cache data structures. In a further embodiment, dynamic scoping binds parameter values to parameters. A dynamically scoped parameter binding in a first computation node can apply only to computation nodes called by the first computation node. In this embodiment, a parameter accessed by a second computation node called from the first computation node will not be added to the first computation node's cache data structure.

In an embodiment, when a computation node is called in association with a set of current parameter values, the cache data structure of the computation node is searched for a previously determined and stored result value corresponding to at least a portion of the current parameter values. If the cache data structure includes a corresponding result value, an embodiment of the invention bypasses execution of the computation node and returns the stored result value instead. Otherwise, an embodiment of the invention executes the computation node. Embodiments of the invention can utilize a cached computation node result values regardless of how the computation node was called to previously determine the result value of the computation node.

In an embodiment, portions of cache data structures can be invalidated when computation nodes are changed without affecting other portions of the cache data structures. An embodiment includes invalidation links between a first computation node's cache data structure and all or a portion of a second computation node's cache data structure. The portion of the second computation node's cache data structure associated with the invalidation link is potentially dependent on the result of the first computation node.

BRIEF DESCRIPTION OF THE DRAWINGS

The invention will be described with reference to the drawings, in which:

FIG. 9 illustrates a computer system suitable for implementing an embodiment of the invention.

DETAILED DESCRIPTION OF THE INVENTION

Figure 1A:
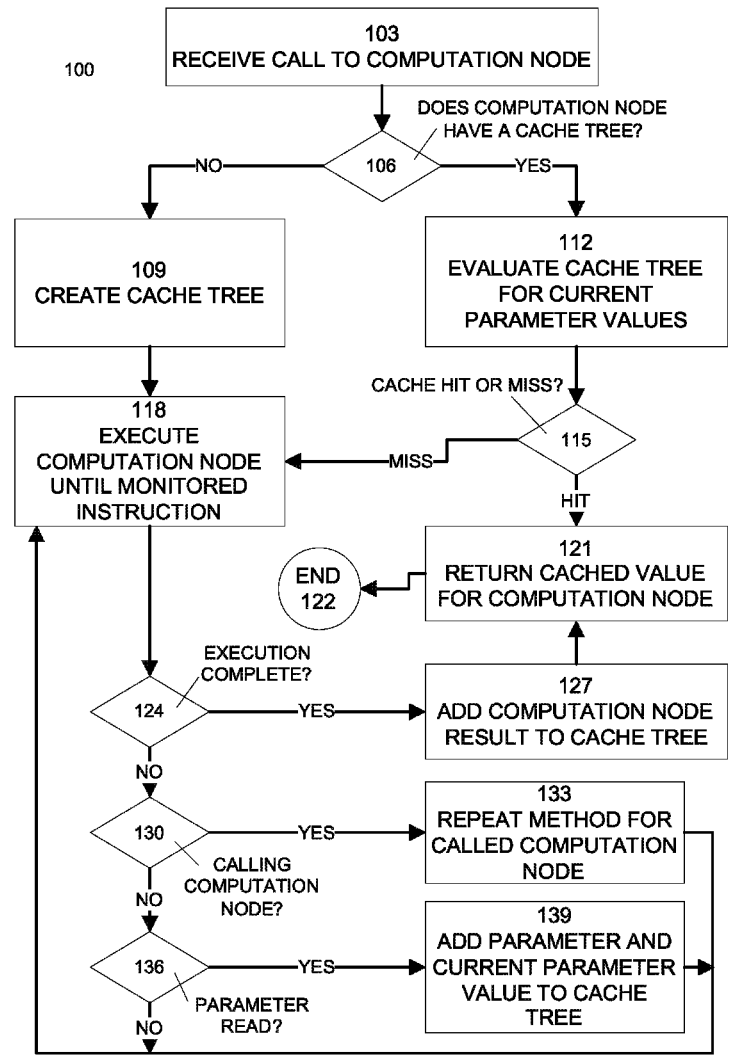
FIGS. 1A, 1B, and 1C illustrate method for creating and evaluating caches for computation nodes according to an embodiment of the invention.
Figure 1B:
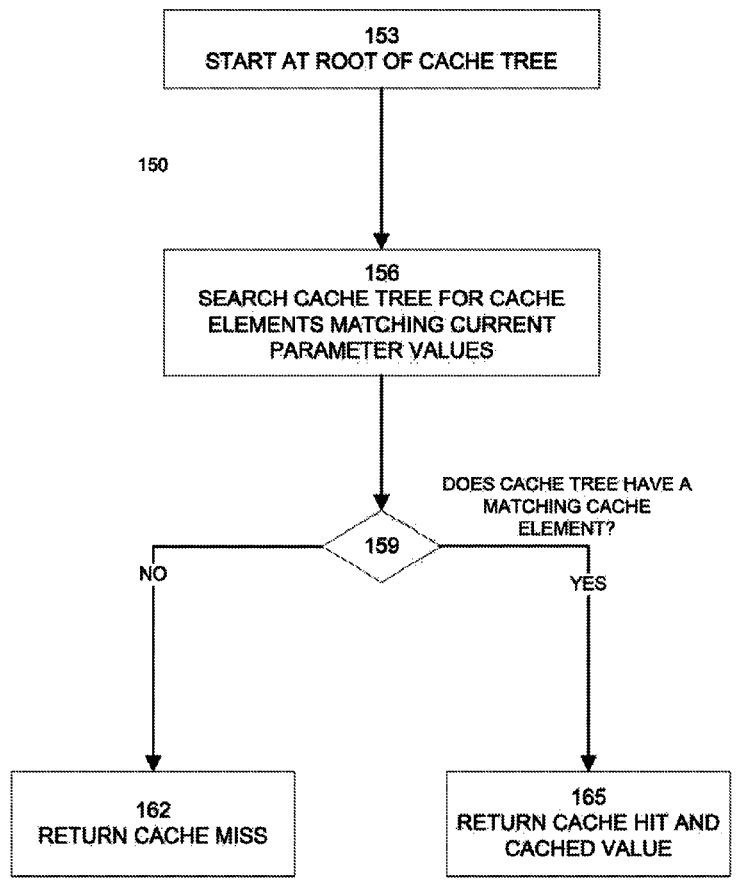

FIGS. 1A and 1B illustrate method for creating and evaluating caches for computation nodes according to an embodiment of the invention. Computation nodes can include programs, scripts, modules, functions, procedures, subroutines, executable data objects, or any other combination of one or more instructions adapted to be executed to determine a value of one or more data outputs. Computation nodes often, but not always, use the values of one or more data inputs, referred to as parameters, to determine their data output values. A computation node can call or execute one or more additional computation nodes to provide intermediate data values used to determine its data outputs. A computation node can also make recursive calls to other instances of itself. Computation nodes can read and use the values of parameters for computation, control flow, or as inputs or outputs of any instruction or sequence of instructions.

Parameters can be specified as any data type, including integers; floating point numbers; characters; strings; Boolean values; geometry data; compound data types such as vectors with two or more dimensions, matrices, structures, arrays, data objects, dictionaries, hash tables, database tables; pointers or other references to one or more parameters, computation nodes, or other types of instructions and/or data components; references to elements, tables, or other structures of a database; and references to internal or external functions, scripts, or executable programs.

FIG. 1A illustrates a method 100 of creating and updating caches of output values of computation nodes according to an embodiment of the invention. Step 103 receives a call to execute a computation node. In an embodiment, step 103 can receive the call to execute a computation node from the initial state of a system, such as when the system requests the execution of a program or a data object, from another computation node, such as when one computation node makes a call to another computation node, or from a prior instance of the computation node, such as when one computation node recursively calls itself.

An embodiment of the invention uses a tree data structure to store or cache previously computed output values of computation nodes. As discussed in detail below, these tree data structures, referred to as cache trees, are dynamically created and updated as computation nodes are executed. In other embodiments, data structures such as dictionaries, hash tables, arrays, or any other type of data structure associating one or more parameters and their values with an output value can be used to store or cache previously computed output values of computation nodes.

Decision block 106 determines if the computation node is already associated with a cache tree. In an embodiment, a computation node may be associated with a cache tree if it has been previously executed. In some embodiments, cache trees of previously executed computation nodes are deleted if they are not executed frequently or if additional memory or data storage is required. In these embodiments, a previously executed computation node may not have an associated cache tree.

If the computation node is not already associated with a cache tree, for example because the computation node is being executed for the first time or the computation node's cache tree was deleted, method 100 proceeds to step 109 to create a cache tree for the computation node. In an embodiment, step 109 associates an initial cache tree data structure including a cache root with the computation node. Following step 109, method 100 proceeds to step 118 to begin execution of the computation node.

Conversely, if the computation node is already associated with a cache tree, then method 100 proceeds from decision block 106 to step 112. Step 112 evaluates the cache tree of the computation node for the current parameter values. Step 112 determines if the cache tree associated with the computation node includes a previously determined output value corresponding with the current parameter values. In an embodiment, step 112 is performed according to method 150, discussed below. If the cache tree associated with the computation node includes a previously determined output value corresponding with the current parameter values, a cache hit occurs and step 112 provides the previously determined output value. Otherwise, step 112 provides a cache miss signal to indicate that the cache tree does not include an output value corresponding with the current parameter values.

Decision block 115 evaluates the results of step 112. If step 112 resulted in a cache hit, method 100 proceeds from decision block 115 to step 121. Step 121 returns the previously stored output value for the computation node to the system or computation node that called the current computation node. Following step 121, method 100 terminates at step 122. It should be noted that in cases where a cache hit occurs, method 100 does not execute the computation node. Instead, the previously determined output value of the computation node is retrieved from the cache tree and returned. This improves the performance of the system by eliminating the need to repeatedly execute a computation node to determine an output value for the same parameter values.

Conversely, if decision block 115 determines that step 112 resulted in a cache miss, then the cache tree of the computation node does not include a previously determined output value of the computation node for the current parameter values. As a result, method 100 proceeds from decision block 115 to step 118 to begin execution of the computation node.

Following either step 109 or decision block 115, step 118 begins execution of the computation node. In an embodiment, the computation node can be executed as object or binary code previously compiled or just-in-time-compiled by the system to execute on one or more processors. In another embodiment, the computation node can be interpreted and/or executed by a virtual machine.

During execution, the computation node may perform operations or execute instructions, operations, functions, procedures, macros, or other routines that are not cached by the system. These instructions may not be cached because their execution time, taken individually, is less than the execution time of embodiments of the invention, because their results are not cacheable, or because these instructions are called with so many different parameter values that it is not feasible to cache all of their results. Examples of these uncached instructions can include basic mathematical operations, control flow instructions, and system resource functions, such as the system time.

In an embodiment, step 118 monitors or detects the execution of instructions pertinent to caching. In an embodiment, these instructions, referred to as monitored instructions, include the end of execution of the instructions of the computation node, the call of another computation node by the current computation node, and the reading of one or more parameters by the computation node.

In an embodiment, these monitored instructions are detected by adding or linking additional caching system instructions during compilation to these monitored types of instructions. The additional caching system instructions are adapted to notify the system and/or execute appropriate portions of method 100 in response to the execution of an associated monitored instruction. For example, a parameter class can be defined in an object-oriented language to include appropriate additional caching system instructions. When a programmer or other user creates a computation node, the parameters of the computation node are derived or inherit methods from the parameter class, and thus include the additional caching system instructions. When a method of a parameter is called, for example to access a parameter value, the additional caching system instructions are executed in addition to any instructions specified by the programmer In another embodiment, interrupts, traps, and other runtime techniques are used to dynamically detect monitored instructions. In still a further embodiment, an interpreter, virtual machine, or other runtime components detects monitored instructions.

Once step 118 detects a monitored instruction, decision blocks 124, 130, and/or 136 are evaluated to update the cache tree of the computation node. In an embodiment, decision blocks 124, 130, and 136 can be evaluated in any order. In a further embodiment, additional decision blocks can be included to handle specific types of monitored instructions.

Decision block 124 determines if the most recently detected monitored instruction indicates the end of the computation node. If so, then step 127 stores the output value of the computation node in the appropriate portion of the cache tree associated with the computation node. Following step 127, method 100 proceeds to step 121 to return the output value of the computation node and step 122 to end this iteration of method 100.

If the most recently detected monitored instruction is not the end of the computation node, then method 100 proceeds from decision block 124 to decision block 130. Decision block 130 determines if the most recently detected monitored instruction is calling an additional computation node, which can be a call to a different computation node or a recursive call to a different instance of the same computation node. If so, then step 133 repeats method 100 for the additional computation node. In an embodiment, method 100 can be called recursively any arbitrary number of times for any arbitrary number of computation nodes called.

When step 133 is complete, that is, when another instance of method 100 has completed its processing of the additional computation node called by the current computation node, method 100 returns to step 118 execute further instructions until another monitored instruction is detected. Additionally, as discussed in detail below, step 133 adds an invalidation link from the cache tree of the called additional node to the current location in the cache tree of the current computation node.

If the most recently detected monitored instruction is not calling another computation node, then method 100 proceeds from decision block 130 to decision block 136. Decision block 136 determines if the most recently detected monitored instruction is reading the value of a parameter. In an embodiment, a monitored instruction can explicitly or implicitly read the value of the parameter. A parameter is explicitly read when the instruction specifically reads the value of the instruction. For example, the instruction "read parameter A" explicitly reads the value of the parameter A. In another example, the instruction "if (parameter B==9)" implicitly reads parameter B, because the conditional statement must read the value of parameter B to determine whether it is equal to "9".

If decision block 136 determines that the most recently detected monitored instruction explicitly or implicitly reads the value of a parameter, then step 139 adds the parameter and its current value to the cache tree of the computation node. As discussed in detail below, adding a parameter and its current value to a computation node's cache tree makes the cached output value of the computation node dependent on that parameter. Because parameters are added to the cache tree dynamically in response to the execution of a parameter read, the computation node's cache tree does not include unnecessary parameters. This reduces the frequency of cache misses for the computation node's cache tree, thereby improving execution performance. Additionally, as discussed in detail below, step 138 may add the parameter and its current value to the cache tree of other computation nodes that directly or indirectly call the computation node under consideration in a given instance of method 100.

Following step 139, method 100 returns to step 118 execute further instructions until another monitored instruction is detected. Steps 118, 124, 130, 133, 136, and 139 are repeated until the computation node completes its execution. As discussed above, when the computation node completes its execution, step 127 stores the computation data in the computation node's cache tree, step 121 returns the output value of the computation node, and step 122 ends this iteration of method 100, returning control to the system or to another instance of method 100 associated with a calling computation node.

FIG. 1B illustrates a method 150 for evaluating the cache tree of a computation node according to an embodiment of the invention. Embodiments of method 150 can be executed by step 112 of method 100, discussed above, or independently of method 100. Method 150 starts at step 153 selects the root of the cache tree.

Starting at the root of the cache tree, step 156 searches for cache elements in the cache tree corresponding with the current values of parameters. Embodiments of step 156 can use either a depth first search, a breadth first search, a hash table lookup, or any other search strategy or graph walking technique known in the art to locate a cache element in the cache tree corresponding to the output data of a computation node for the current parameter values.

Decision block 159 evaluates whether step 156 was able to locate a cache element in the computation node's cache tree that corresponds with the current parameter values. If there are no cache elements in the cache tree corresponding with the current parameter values, step 162 returns a cache miss indicator. Conversely, if step 156 identifies a cache element in the cache tree corresponding with the current parameter values, step 165 returns the previously determined output value of the computation node stored in the identified cache element.

Figure 1C:
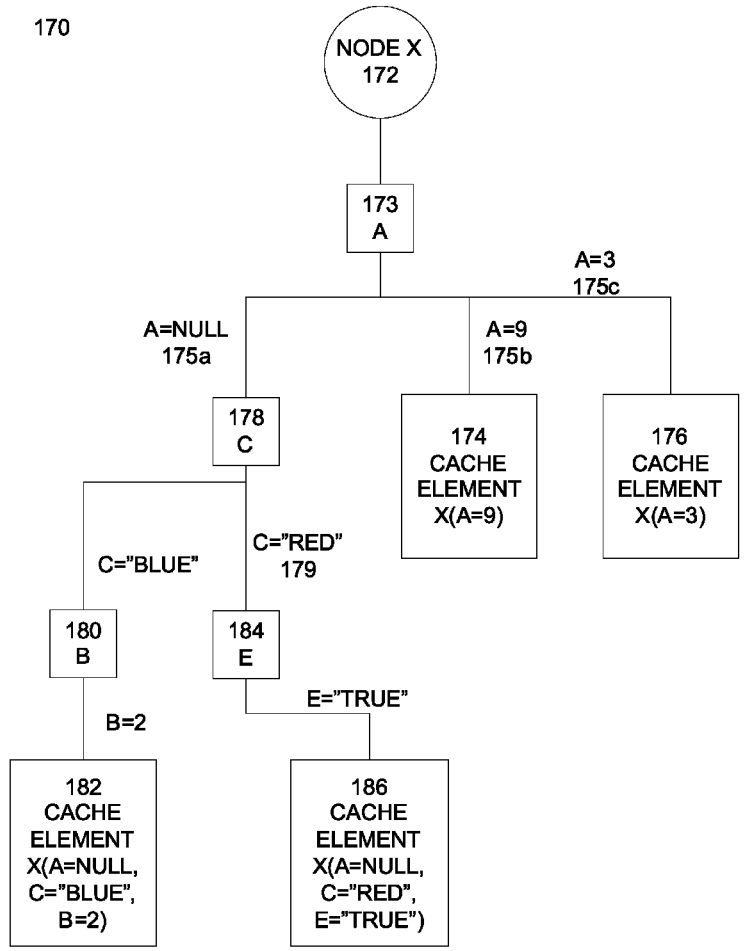

FIG. 1C illustrates an example cache tree 170 suitable for use with embodiments of the invention. Cache tree 170 includes a cache root 172 and leaves or cache elements 174, 176, 182, and 186. In an embodiment, each leaf of the cache tree 170 is a cache element adapted to store a previously determined output value of the computation node. For example, cache element 174 is adapted to store the value of the computation node when parameter A=9.

Each cache element can be associated with different parameter values and/or different parameters. For example, cache element 174 stores the value of the computation node when parameter A=9 and cache element 176 stores the value of the computation node when parameter A=3. Furthermore, example cache element 182 stores the value of the computation node when parameter A is null or undefined, parameter C is set to the "BLUE," and parameter B=2. The parameters associated with one cache element are independent of the parameters associated with any other cache element.

As can be seen in FIG. 1C, the path in the cache tree between the root element 172 and a cache element is specified by the parameters and parameter values corresponding with the cache element value. Thus, to determine if the cache tree has a cache entry for a given set of input parameters, an embodiment of the invention searches or "walks" from the root element.

For example, to search for a cache element corresponding to the parameter values of A=null, C="RED," and E="TRUE," an embodiment of the invention starts at the root element 172. The root element 172 of the cache tree is connected with a cache parameter element 173 representing the parameter A. Cache parameter element has three branches, 175a, 175b, and 175c, representing the parameter values of A=null, A=9, and A=3, respectively.

At each cache parameter element, an embodiment of the invention selects the branch matching the current value of that parameter. For the current example in which parameter A=null, an embodiment of the invention will select branch 175a, which corresponds to this parameter value. If the current parameter value does not match any branches at the current parameter element, then there are no cache elements in this path of the cache tree that correspond with the current parameter values.

In the current example, an embodiment of the invention follows the selected branch 175a to cache parameter element 178, which represents parameter C. An embodiment of the invention then selects branch 179, which corresponds with parameter C="RED." From cache parameter element 184, representing parameter E, an embodiment of the invention selects cache element 186, which stores the value of the computation node for A=null, C="RED," and E="TRUE."

It should be noted that there may be multiple cache parameter elements connected with the root element of a cache tree.

Figure 2:
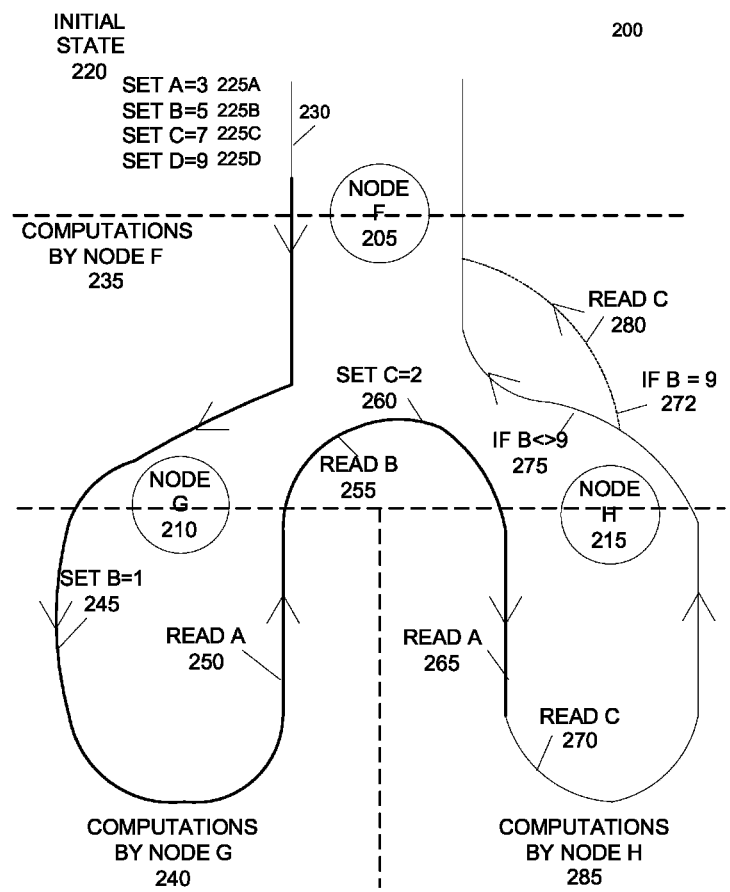
FIG. 2 illustrates a dataflow diagram for example computation nodes to illustrate an embodiment of the invention.

An embodiment of method 100 will be illustrated in more detail with the following example. FIG. 2 illustrates a dataflow diagram 200 for example computation nodes to illustrate an embodiment of the invention. Dataflow diagram 200 illustrates the sequence of data processing by computation nodes to produce output data. Computation nodes can include programs, scripts, modules, functions, procedures, subroutines, executable data objects, or any other combination of one or more instructions adapted to be executed to determine a value of one or more data outputs. Computation nodes often, but not always, use the values of one or more data inputs, referred to as parameters, to determine their data output values. A computation node can call or execute one or more additional computation nodes to provide intermediate data values used to determine its data outputs.

The example dataflow diagram 200 includes computation nodes F 205, G 210, and H 215. Each of the example computation nodes 205, 210, and 215 can execute instructions, return output data, and call other computation nodes. Computation nodes 205, 210, and 215 can read and use the values of parameters for computation, control flow, or as inputs or outputs of any instruction or sequence of instructions.

In an embodiment, parameters are specified by parameter bindings 225 that associate a parameter with a parameter value. Parameters can be specified as any data type, including integers; floating point numbers; characters; strings; Boolean values; geometry data; compound data types such as vectors with two or more dimensions, matrices, structures, arrays, data objects, dictionaries, hash tables, database tables; pointers or other references to one or more parameters, computation nodes, or other types of instructions and/or data components; references to elements, tables, or other structures of a database; and references to internal or external functions, scripts, or executable programs.

When a computation node is called for the first time, an embodiment of the invention creates a cache tree for the computation node. The cache tree is used to cache output values of the computation node. Upon subsequent calls to a computation node, the computation node's cache tree is evaluated to determine if the desired result has been previously determined. If so, the appropriate cached output value is retrieved from the computation node's cache tree and execution of the computation node is bypassed. If the cache tree does not include a cached output value matching the call to the computation node, the computation node is executed to determine the corresponding output value. This output value is returned to the calling node. Additionally, the cache tree of the called computation node is updated with the output value. As discussed in detail below, output values of computation nodes are indexed in the cache tree using only the parameters relevant to each computation node.

Dataflow diagram 200 includes an initial state 220 that includes parameter bindings 225a, 225b, 225c, and 225d. Parameter bindings 225a, 225b, 225c, and 225d create and associate or bind parameter A=3, B=5, C=7, and D=9. In an embodiment, parameters are dynamically scoped. As described in more detail below, dynamic scoping allows a computation node to override one or more previous bindings of a parameter to associate a parameter with a different value. The new parameter binding will affect any computation nodes called by the current computation node, but will not affect the current computation node or any higher-level computation nodes.

The processing of data in dataflow diagram 200 is illustrated by path 230, which corresponds with the sequence of execution of instructions by computation nodes F 205, G 210, and H 215. Path 230 in dataflow diagram 230 is equivalent to the following pseudocode shown in Table 1. For clarity, additional instructions for calculating results of computation nodes F 205, G 210, and H 215 that are not pertinent to caching have been omitted for clarity from this example.

TABLE 1

Example Pseudocode for Dataflow Diagram 200

```
Node F {
   call node G;
   read parameter B;
   set parameter C = 2;
   call node H;
   if parameter B=5 {
      compute and return result;
   } else {
      read parameter C;
      compute and return result;
   }
}
Node G {
   set parameter B=1;
   read parameter A;
   compute and return result of Node G;
}
Node H {
   read parameter A;
   read parameter C;
   compute and return result of Node G;
}
```

Figure 3A:
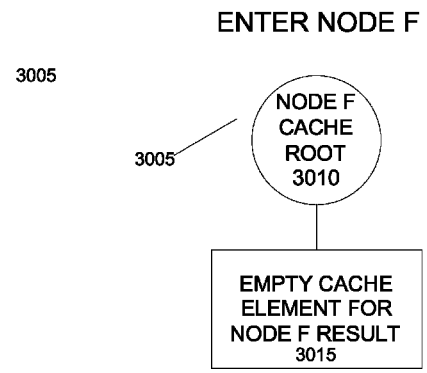
FIGS. 3A-3J illustrate the creation of cache trees corresponding with the example computation nodes according to an embodiment of the invention.

Starting in the initial state 220, the node F 205 is called for execution. Path 230 enters region 235 of the dataflow diagram 200, in which node F 205 executes its instructions. When computation node F 205 is called for the first time, an embodiment of the invention creates a cache tree for computation node F 205. FIG. 3A illustrates an initial cache tree 3005 for computation node F 205 according to an embodiment of the invention. The initial cache tree 3005 includes a cache root 3010 and an empty cache element 3015 adapted to store an output data value for computation node F 205.

Returning to the dataflow diagram 200 in FIG. 2, execution proceeds along path 230. The first instruction of node F 205 calls node G 210. Accordingly, path 230 exits region 235 and enter region 240, which corresponds with the instructions executed by node G 210. When computation node G 210 is called for the first time, an embodiment of the invention creates a cache tree for computation node G 210.

Figure 3B:
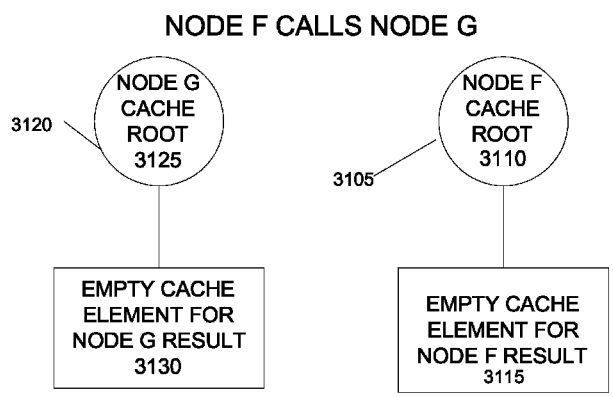

FIG. 3B illustrates the set of cache trees 3100 of computation nodes F 205 and G 210 when computation node F 205 calls node G 210 for the first time. Node G 210 is associated with cache tree 3120 and node F 205 is associated with cache tree 3105. Cache tree 3120 of node G 210 includes a cache tree root 3125 and an empty cache element 3130 adapted to store an output data value for computation node G 210. As discussed above, the cache tree 3105 associated with computation node F 205 includes a cache root 3110 and an empty cache element 3115 adapted to store an output data value for computation node F 205.

Returning to the dataflow diagram 200 in FIG. 2, execution proceeds along path 230 to the instruction "Set B=1" 245. This instruction 245 overrides any previous associations of parameter B with other values. In an embodiment with dynamic scoping, instruction 245 applies the assignment of the parameter B=1 to any computation node called by computation node G 210, if any. In this example, computation node G 210 does not call any further computation nodes, so instruction 245 will have no effect.

Following instruction 245, instruction 250 reads the value of parameter A. In this example, the value of parameter A is 3, as specified by the initial parameter binding 225a. In an embodiment, any instruction or operation that reads, accesses, or is otherwise dependent on a value of a parameter indicates that the computation node including that instruction is parameterized by that parameter. For example, because computation node G 210 includes instruction 250 that reads the value of parameter A, the output data of computation node G 210 is dependent on (i.e. parameterized by) parameter A. Thus, the cache tree of computation node G 210 needs to be updated to reflect this parameterization.

Figure 3C:
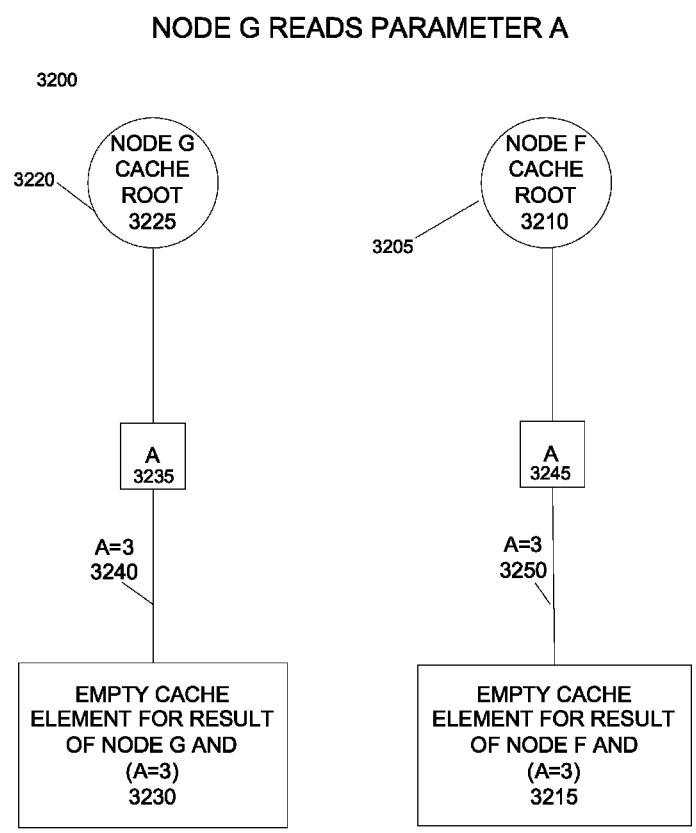

FIG. 3C illustrates the set of cache trees 3200 of computation nodes F 205 and G 210 when computation node G 210 reads the value of parameter A. In an embodiment, the system updates the cache tree 3120 to create cache tree 3220, which reflects the dependency of computation node G 210 on parameter A after computation node G 210 reads the value of parameter A. In this embodiment, the updated cache tree 3220 includes a cache tree root 3225. The cache tree root 3225 is connected with a cache parameter element 3235. Cache parameter element 3225 indicates that the computation node G 210 depends on parameter A. Additionally, cache parameter element 3235 is connected via link 3240 with the empty cache element 3230 adapted to store an output data value for computation node G 210. Link 3240 is marked with "A=3," indicating that the output data of computation node G 210 will be based, at least in part, on the parameter A associated with the value of 3 for this iteration of computation node G 210.

Additionally, because computation node G 210 is called by computation node F 205, computation node F 205 is also dependent on (i.e. parameterized by) parameter A. Accordingly, the system updates the cache tree 3105 associated with computation node F 205 to create cache tree 3205, which reflects the dependency of computation node F 205 on parameter A after computation node G 210 reads the value of parameter A. The updated cache tree 3205 includes a cache tree root 3210 connected with a cache parameter element 3245. Cache parameter element 3245 indicates that the computation node F 205 depends on parameter A. Additionally, cache parameter element 3245 is connected via link 3250 with the empty cache element 3215 adapted to store an output data value for computation node F 205. Link 3250 is marked with "A=3," indicating that the output data of computation node F 205 will be based, at least in part, on the parameter A associated with the value of 3 for this iteration of computation node F 205.

Returning to the dataflow diagram 200 in FIG. 2 and following instruction 250, computation node G 210 returns a result to computation node F 205. An embodiment of the invention caches the result of computation node G 210 so that this value can be reused on future calls to computation node G 210 with the same parameter values.

Figure 3D:
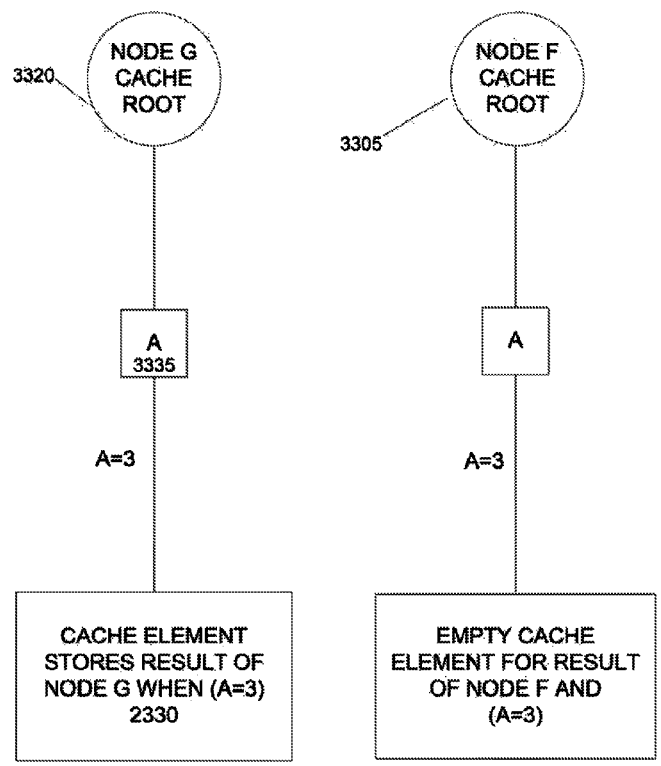

FIG. 3D illustrates the set of cache trees 3300 of computation nodes F 205 and G 210 when computation node G 210 returns a value to computation node F 205. An embodiment of the invention updates the cache tree 3220 associated with computation node G 210 to create cache tree 3320. Cache tree 3320 is similar to cache tree 3220, with the exception that the cache element 3335 stores the value returned by computation node G 210. Because computation node G 210 reads only a single parameter, parameter A, and does not call any further computation nodes, the result of computation node G is dependent on, at the most, parameter A, when parameter A=3. The cache tree 3320 indicates this dependency with cache parameter element 3335. The cache tree 3305 associated with computation node F 205 remains unchanged at this point from cache tree 3205.

As discussed in detail below, parameters can change the control flow of computation nodes. For example, computation node G 210 may execute different instructions and access other parameters when parameter A is not equal to 3. Thus, computation node G 210 may be dependent on additional parameters when parameter A is not equal to 3. In an embodiment, these additional dependencies are discovered dynamically as computation nodes are executed with different values of parameters.

Returning to the dataflow diagram 200 in FIG. 2, after computation node G 210 returns a result value to computation node F 205, instruction 255 in computation node F reads the value of parameter B. In this example, the value of parameter B is 5, as specified by the initial parameter binding 225*b*. It should be noted that the association of B=1 in computation node G 210 by instruction 245 does not affect the value of this parameter in computation node F 205, because the dynamic scoping of instruction 245 only applies to computation nodes called by computation node G 210.

As discussed above, any instruction or operation that reads, accesses, or is otherwise dependent on a value of a parameter indicates that the computation node including that instruction is parameterized by that parameter. Thus, because computation node F 205 includes instruction 255 that reads the value of parameter B, the output data of computation node F 205 is dependent on (i.e. parameterized by) parameter B. Thus, the cache tree of computation node F 205 needs to be updated to reflect this parameterization.

Figure 3E:
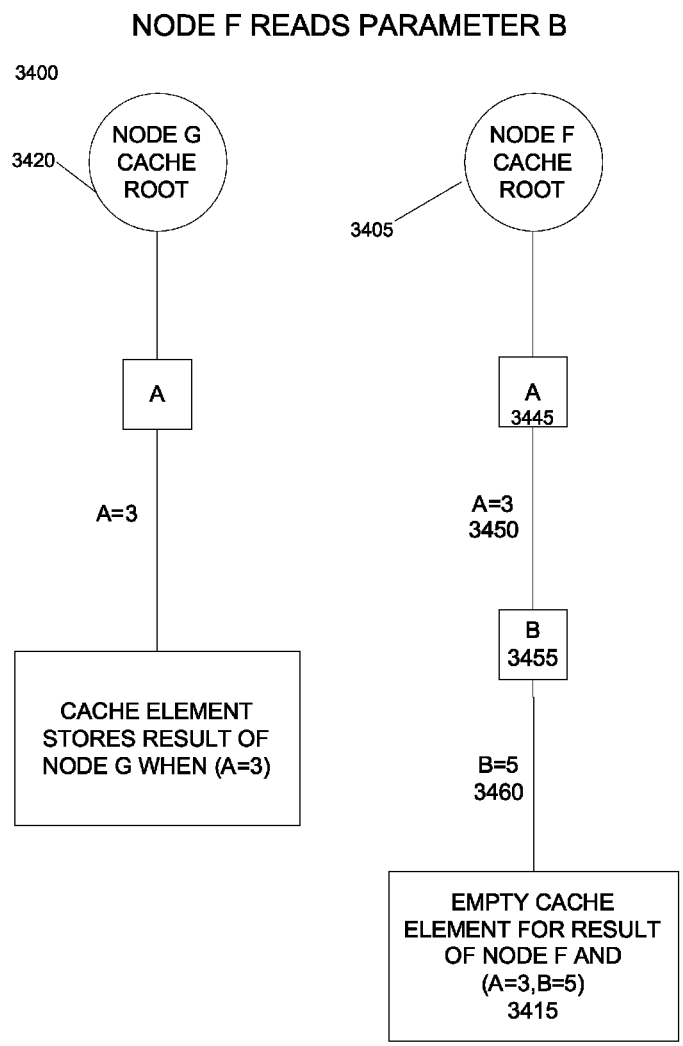

FIG. 3E illustrates the set of cache trees 3400 of computation nodes F 205 and G 210 when computation node F 205 reads the value of parameter B. In an embodiment, the system updates the cache tree 3305 to create cache tree 3405 that reflects the dependency of computation node F 205 on parameter B after computation node F 205 reads the value of parameter B. In this example, the updated cache tree 3405 includes a second cache parameter element 3455 connected with cache parameter element 3445 via link 3450. The second cache parameter element 3455 indicates that computation node F 205 depends on parameter B. Additionally, the second cache parameter element 3455 is connected via link 3460 with the empty cache element 3415. Link 3460 is marked with "B=5" to indicate that the output data for the current iteration of computation node F 205 will be based, at least in part, on the parameter B associated with the value of 5.

Because computation node G 210 has completed its execution when instruction 255 is executed, the cache tree 3420 for node G is unchanged from cache tree 3320 discussed above.

Following instruction 255 in the dataflow diagram 200 of FIG. 2, instruction 260 sets the parameter C=2. This instruction 260 overrides any previous associations of parameter C with other values. In an embodiment with dynamic scoping, instruction 260 applies the assignment of the parameter C=2 to any computation node subsequently called by computation node F 205. Following instruction 260, computation node F 205 calls computation node H 215. Thus, the parameter binding of C=2 will apply within computation node H 215 and any computation nodes called by computation node H 215.

Figure 3F:
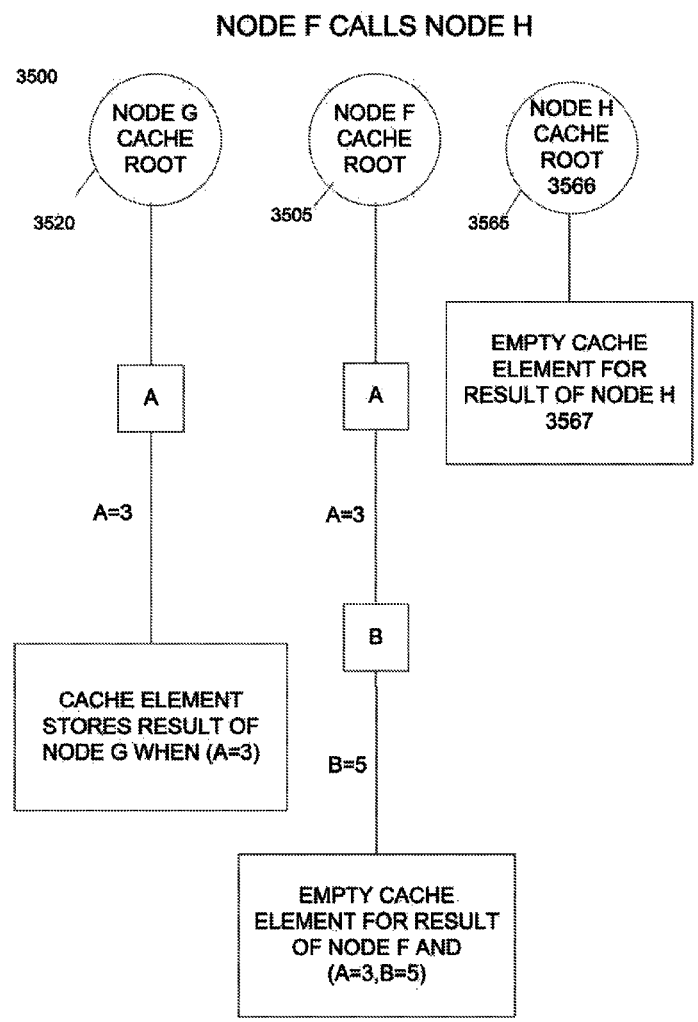

Upon calling computation node H 215 for the first time, an embodiment of the invention creates a cache tree for computation node H 215. FIG. 3F illustrates the set of cache trees 3500 of computation nodes F 205, G 210, and H 215 when computation node F 205 calls node H 215 for the first time.

The cache trees 3505 and 3520 of computation nodes F 205 and G 210, respectively, are unchanged from cache trees 3405 and 3420 discussed above. Node H 215 is associated with cache tree 3565. Cache tree 3565 includes a cache tree root 3566 and an empty cache element 3567 adapted to store an output data value for computation node H 215.

Returning to FIG. 2, computation node H 215 includes instruction 265 to read parameter A. In this example, the value of parameter A is 3, as specified by the initial parameter binding 225*a*. Because computation node H 215 reads the value of parameter A, the output data of computation node H 215 is dependent on (i.e. parameterized by) parameter A. Thus, the cache tree of computation node H 215 needs to be updated to reflect this parameterization.

Figure 3G:
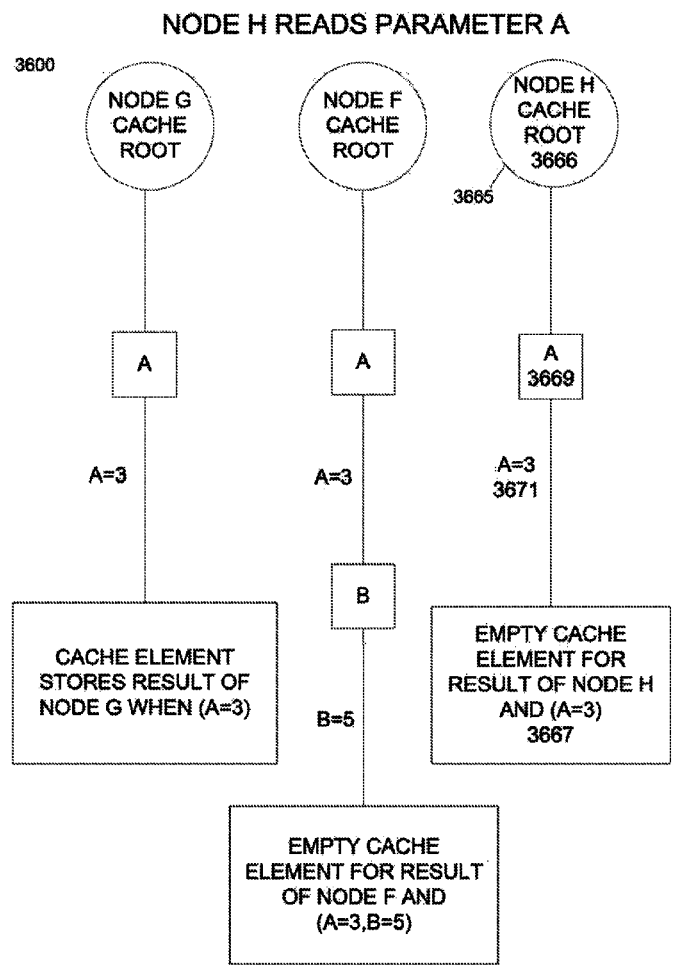

FIG. 3G illustrates the set of cache trees 3600 of computation nodes F 205, G 210, and H 215 when computation node H 215 reads the value of parameter A. An embodiment of the invention updates the cache tree 3565 associated with computation node H 215 to create cache tree 3665. Cache tree 3665 includes the cache tree root 3666 connected with a cache parameter element 3669. Cache parameter element 3669 indicates that the computation node H 215 depends on parameter A. Additionally, cache parameter element 3669 is connected via link 3671 with the empty cache element 3667 adapted to store an output data value for computation node H 215. Link 3671 is marked with "A=3," indicating that the output data of computation node H 215 will be based, at least in part, on the parameter A associated with the value of 3 for this iteration of computation node H 215. Because computation node H 215 is called by computation node F 205, computation node is also dependent on parameter A. However, parameter A is already in the cache tree of computation node F 205, so no further updates are required.

Returning to FIG. 2, computation node H 215 includes instruction 270 to read parameter C. In this example, the value of parameter C is 2, as specified by the parameter binding of instruction 260 in computation node F 205. Thus, the cache tree of computation node H 215 needs to be updated to reflect this dependence on parameter C.

Figure 3H:
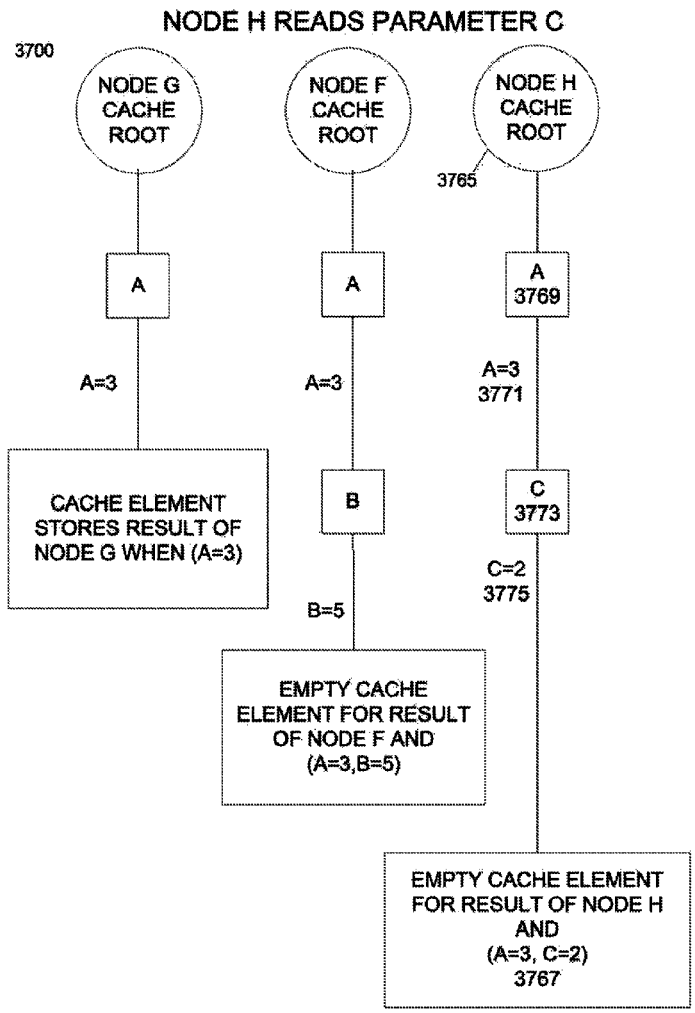

FIG. 3H illustrates the set of cache trees 3700 of computation nodes F 205, G 210, and H 215 when computation node H 215 reads the value of parameter C. An embodiment of the invention updates the cache tree 3665 associated with computation node H 215 to create cache tree 3765. The updated cache tree 3765 includes a second cache parameter element 3773 connected with cache parameter element 3769 via link 3771. The second cache parameter element 3773 indicates that computation node H 215 depends on parameter C. Additionally, the second cache parameter element 3773 is connected via link 3775 with the empty cache element 3767. Link 3775 is marked with "C=2" to indicate that the output data for the current iteration of computation node H 215 will be based, at least in part, on the parameter C associated with the value of 2.

Returning to FIG. 2, following the execution of instruction 270 in computation node H 215, computation node H 215 returns a result to computation node F 205. An embodiment of the invention caches the result of computation node H 215 so that this value can be reused on future calls to computation node H 215 with the same parameter values.

Figure 3I:
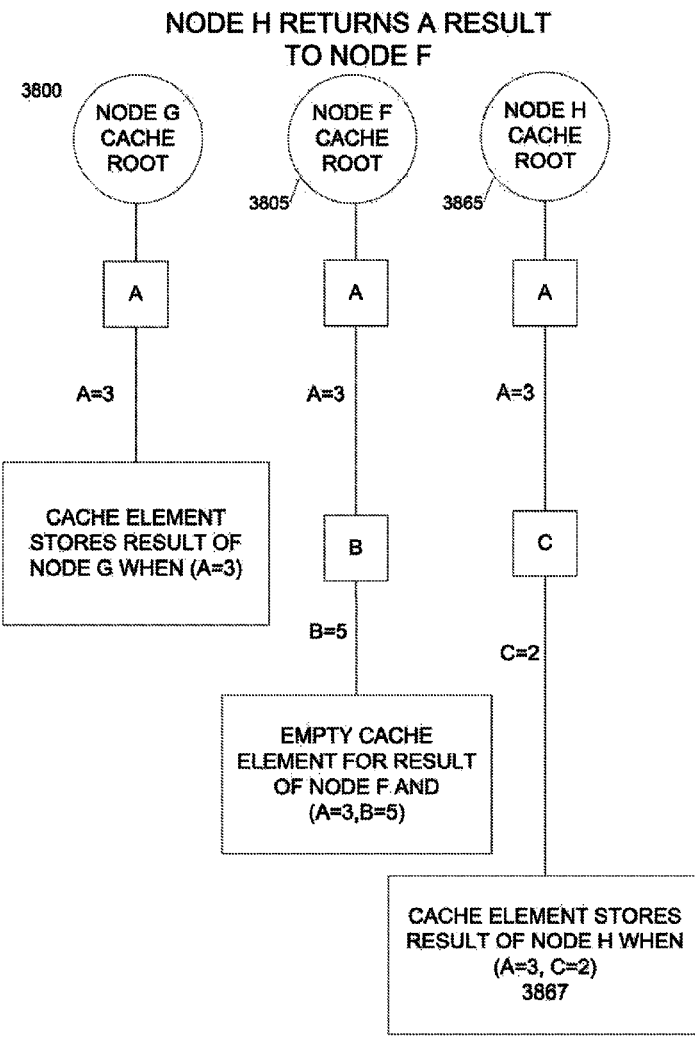

FIG. 3I illustrates the set of cache trees 3800 of computation nodes F 205, G 210, and H 215 when computation node H 215 returns a value to computation node F 205. An embodiment of the invention updates the cache tree 3765 associated with computation node H 215 to create cache tree 3865. Cache tree 3865 is similar to cache tree 3765, with the exception that the cache element 3867 stores the value returned by computation node H 215. Because computation node H 215 reads parameters A and C and does not call any further computation nodes, the result of computation node H 215 is dependent on, at the most, parameters A and C, when A=3 and C=2.

Returning to FIG. 2, following the execution of computation node H 215, computation node F 205 evaluates the value of parameter B at conditional statement "if B=9" 272. Because this conditional statement 272 must read parameter B to evaluate this statement, the cache tree associated with computation node F 205 needs to include a dependence on parameter B. In this example, because cache tree 3805 already includes a cache parameter element for parameter B, no further updates to the cache tree associated with computation node F 205 are needed.

Because the value of parameter B in this iteration of computation node F 205 does not satisfy the logical condition of conditional statement 272, the computation node F 205 follows program flow path 275. Computation node F 205 then completes its execution and returns a result.

Figure 3J:
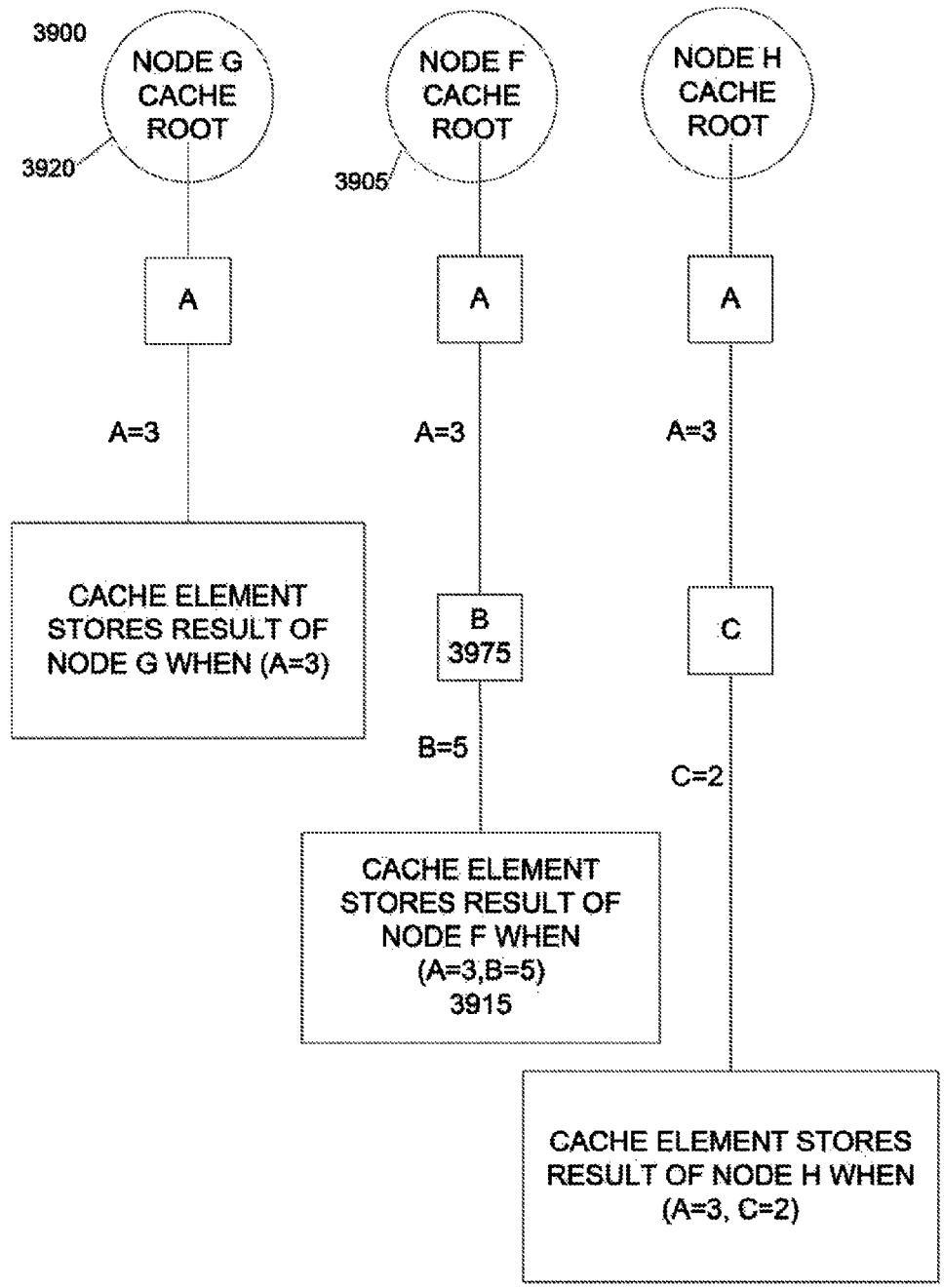

FIG. 3J illustrates the set of cache trees 3900 of computation nodes F 205, G 210, and H 215 when computation node F 205 completes execution and returns a result. An embodiment of the invention updates the cache tree 3805 associated with computation node F 205 to create cache tree 3905. Cache tree 3905 is similar to cache tree 3805, with the exception that the cache element 3915 stores the value returned by computation node F 205. Because computation node F 255 reads parameters A and B, the result of computation node F 205 is dependent on, at the most, parameters A and B, when A=3 and B=5.

The set of cache trees 3900 represent data caches for computation nodes F 205, G 210, and H 215. When any or all of these computation nodes are called again, either by the dataflow 200 described in FIG. 2 or in any other context, these cache trees 3900 can be used to improve execution performance. In an embodiment, as described in method 150 above, when a computation node is called, its associated cache tree is walked using the current parameter values to determine if a previously defined cache element corresponding to the current parameter values exists. If so, then the stored output value from this cache element is retrieved and returned in response to the call. In this case, the execution of the computation node can be skipped, since the result of this computation node for the current parameter values has determined before and stored.

If the cache tree associated with a computation node does not include a previously defined cache element corresponding to the current parameter values, the computation node is executed to determine an output value corresponding with the current parameter values and, in an embodiment, to further update the cache tree of the computation node.

For example, if computation node F 205 is called again and the parameters A=3 and B=5, then the output value stored in cache element 3915 of cache tree 3905 is retrieved and returned in response to the call.

Figure 4:
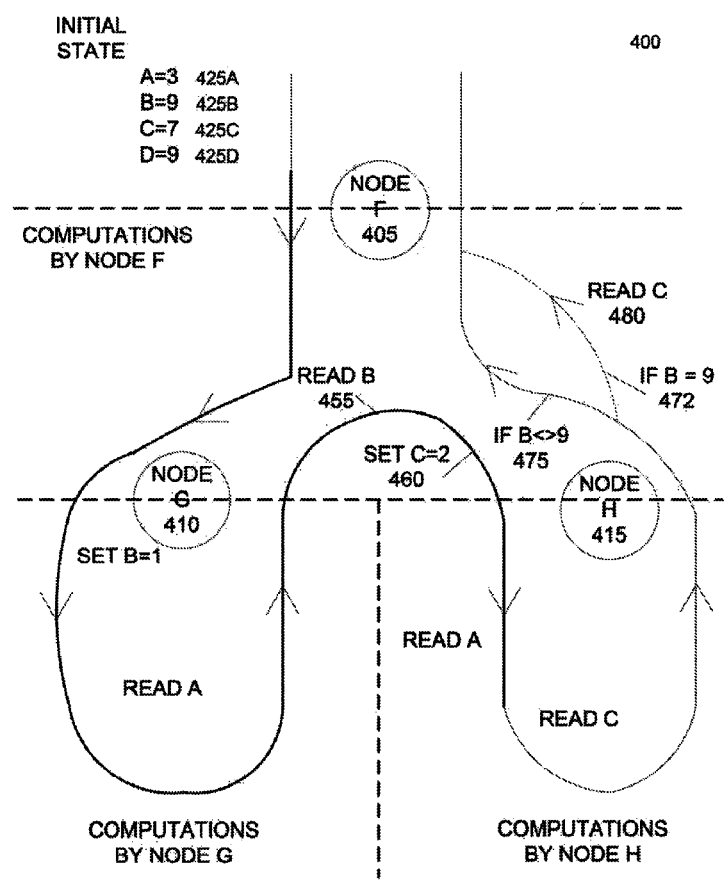
FIG. 4 illustrates a modified dataflow diagram for the example computation nodes to illustrate an embodiment of the invention.

Continuing with the above example, FIG. 4 illustrates a modified dataflow diagram 400 for the example computation nodes to illustrate an embodiment of the invention. Modified dataflow diagram is the same as dataflow diagram 200, only the value of parameter B has been changed from 5 to 9 by parameter binding 425b. Parameters A, C, and D are set to 3, 7, and 9, respectively, by parameter bindings 425a, 425c, and 425d.

Execution of dataflow diagram 400 begins with the system calling node F 405. Upon calling node F 405, an embodiment of the system performs method 150 discussed above to determine if the cache tree associated with node F 405 includes a cached output value for the current parameter values: A=3, B=9, C=7, and D=9. In this example, the computation node F 405 is associated with cache tree 3905 in FIG. 3J. Because cache tree 3905 includes cache parameter element 3975 for parameter B, the cached value of computation node F 405 depends on parameter B. However, because the value of parameter B has changed in this example, a cache miss will occur because there is no cache element in the cache tree 3905 associated with parameter B=9. In response to the cache miss, an embodiment of the system will execute the instructions of node F 405.

This example executes computation node F 405 in a similar manner previously discussed. Computation node F 405 calls computation node G 410. Upon calling node G 410, an embodiment of the system performs method 150 discussed above to determine if the cache tree associated with node G 410 includes a cached output value for the current parameter values: A=3, B=9, C=7, and D=9. In this example, the computation node G 410 is associated with cache tree 3920 in FIG. 3J. Because cache tree 3920 does not include any cache parameter elements for parameter B, the cached value of computation node G 410 is not affected by the change in value of parameter B. By walking cache tree 3920, an embodiment of the invention locates a cache element matching the current parameter value of A=3. An embodiment of the invention then returns the cached value of computation node G 410, rather than executing the instructions of computation node G 410 again with the same parameter values.

Upon returning to computation node F 405 after retrieving the cached value for computation node G 410, computation node F 405 executes instruction 455 that reads the value of parameter B, which is currently set to 9. Upon reading the value of parameter B, an embodiment of invention updates the cache tree of computation node F 405 to reflect this dependence on parameter B=9.

Figure 5A:
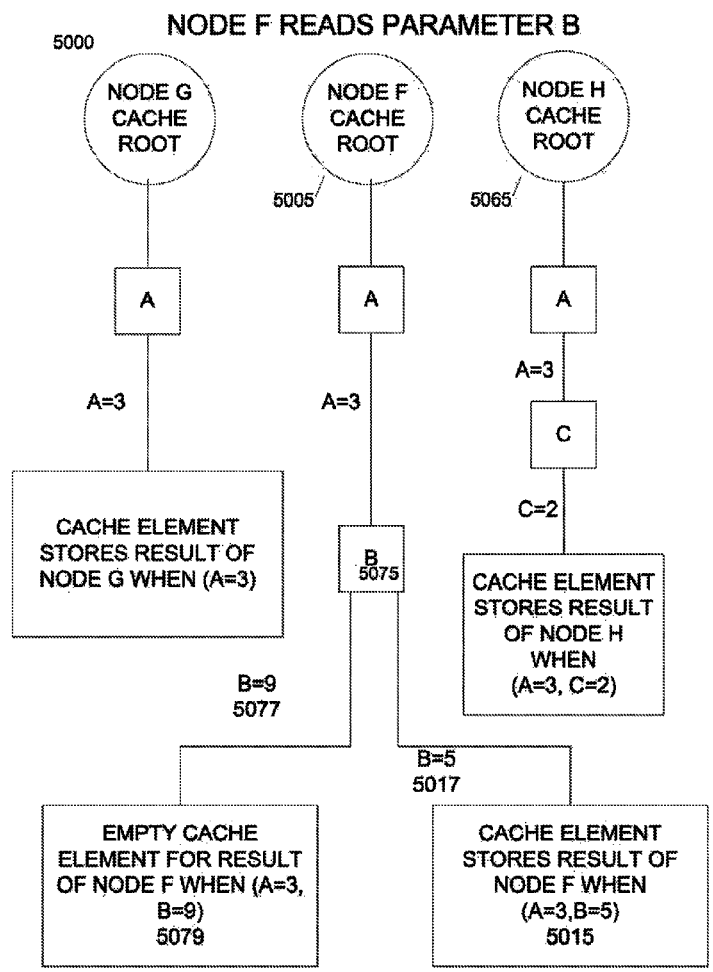
FIGS. 5A-5C illustrate the modification of cache trees corresponding with the example computation nodes according to an embodiment of the invention.

FIG. 5A illustrates the set of cache trees 5000 of computation nodes F 405, G 410, and H 415 when computation node F 405 reads the value of parameter B. In an embodiment, the system updates the cache tree 3905 to create cache tree 5005 that reflects the dependency of computation node F 405 on parameter B=9. In this example, the cache tree 5005 already includes cache parameter element 5075 representing parameter B. Cache parameter element 5075 was previously connected with cache element 5015 via link 5017 to store the value of computation node F 405 when parameter B previously was set to 5. An embodiment of the invention adds link 5077 to connect cache parameter element 5075 with a new empty cache element 5079. The newly added empty cache element 5079 is adapted to store the value of computation node F 405 when parameter A=3 and parameter B=9.

Returning to the dataflow diagram 400, following instruction 155, instruction 160 sets parameter C=2 for all computation nodes subsequently called by computation node F 405. Instruction 460 has no immediate effect on any cache trees. Following instruction 460, computation node 405 calls computation node H 415.

Upon calling node H 415, an embodiment of the system performs method 150 discussed above to determine if the cache tree associated with node H 415 includes a cached output value for the current parameter values: A=3, B=9, C=7, and D=9. In this example, the computation node H 415 is associated with cache tree 5065 in FIG. 5A. Because cache tree 5065 does not include any cache parameter elements for parameter B, the cached value of computation node H 415 is not affected by the change in value of parameter B. By walking cache tree 5065, an embodiment of the invention locates a cache element matching the current parameter values of A=3 and C=2. An embodiment of the invention then returns the cached value of computation node H 415, rather than executing the instructions of computation node H 415 again with the same parameter values.

Upon returning to computation node F 405 after retrieving the cached value for computation node H 415, computation node F 405 evaluates the value of parameter B at conditional statement "if B=9" 472. In this example, because cache tree 5005 already includes a cache parameter element for parameter B, no further updates to the cache tree associated with computation node F 405 are needed.

Because the value of parameter B in this iteration of computation node F 405 satisfies the logical condition of conditional statement "if B=9" 472, the computation node F 405 follows program flow path 477 and executes instruction 480. Instruction 480 reads the value of parameter C. Thus, computation node F 405 is dependent on parameter C when parameter B=9. For other values of parameter B, the computation node F does not depend on parameter C. Therefore, upon reading the value of parameter C for instruction 480, an embodiment of invention updates the cache tree of computation node F 405 to reflect this dependence on parameter C when parameter B=9.

Figure 5B:
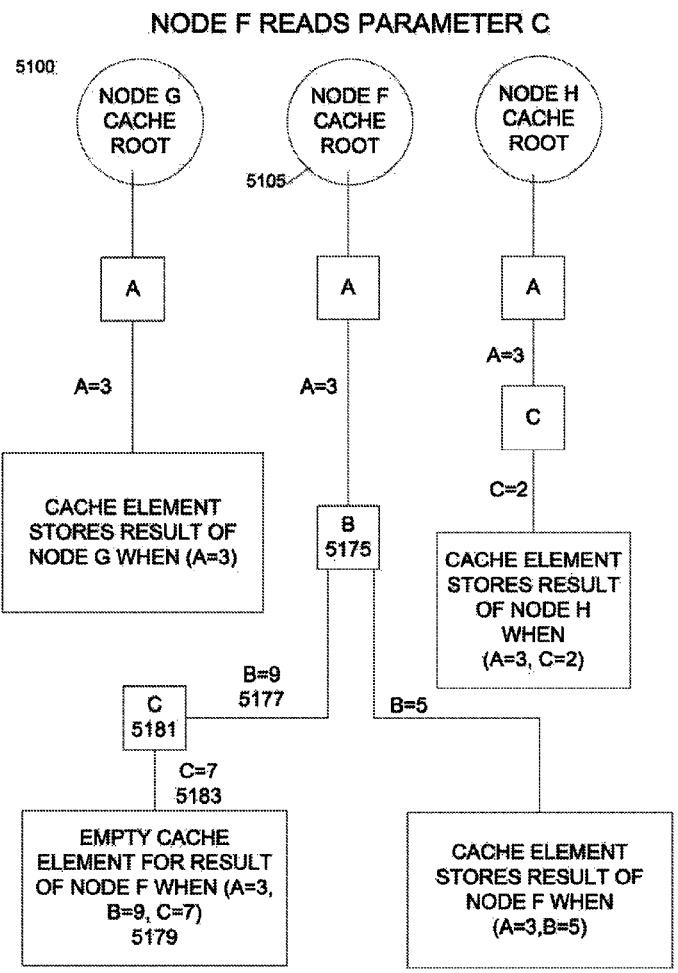

FIG. 5B illustrates the set of cache trees 5100 of computation nodes F 405, G 410, and H 415 when computation node F 405 reads the value of parameter C. In an embodiment, the system updates the cache tree 5005 to create cache tree 5105 that reflects the dependency of computation node F 405 on parameter C when parameter B=9. In this example, a cache parameter element 5181 representing parameter C is added to the cache tree 5105. Cache parameter element 5181 is connected via link 5177 with cache parameter element 5175. This connection indicates that computation node F 405 depends on the value of parameter C when parameter B=9. Additionally, cache parameter element 5181 is connected with the empty cache element 5179 via link 5183. Empty cache element 5179 is adapted to store the value of computation node F 405 when parameter A=3, parameter B=9, and parameter C=7.

Figure 5C:
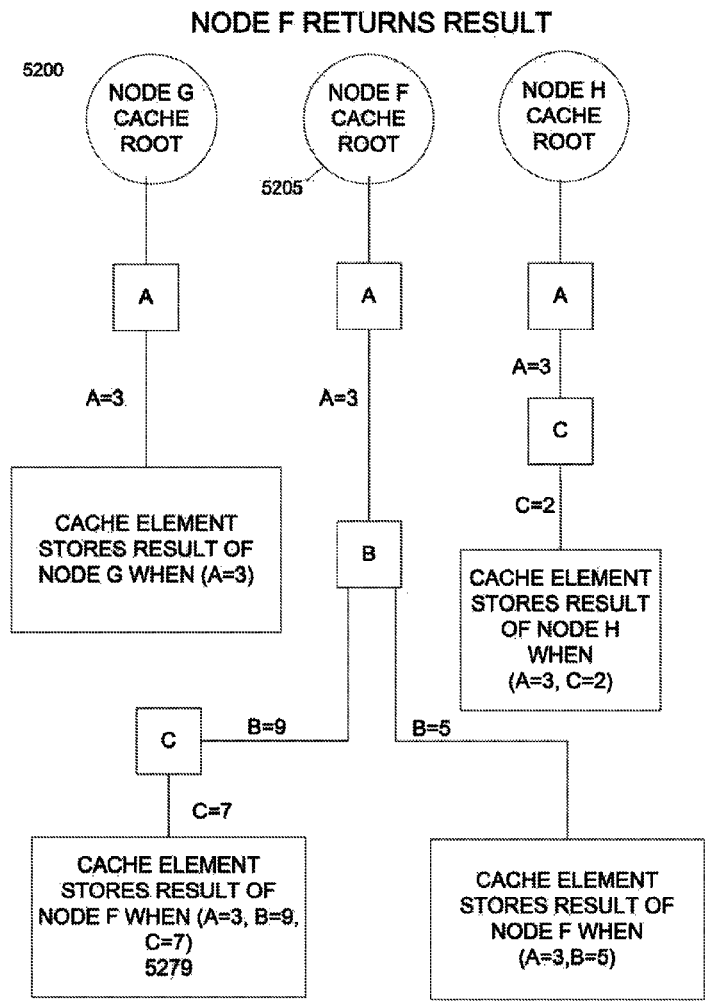

Following instruction 480, computation node executes any other instructions necessary to determine a result. FIG. 5C illustrates the set of cache trees 5200 of computation nodes F 405, G 410, and H 415 when computation node F 405 completes execution and returns a result. An embodiment of the invention updates the cache tree 5105 associated with computation node F 405 to create cache tree 5205. Cache tree 5205 is similar to cache tree 5105, with the exception that the cache element 5279 stores the output value returned by computation node F 405 corresponding with parameter values of A=3, B=9, and C=7.

Figure 6:
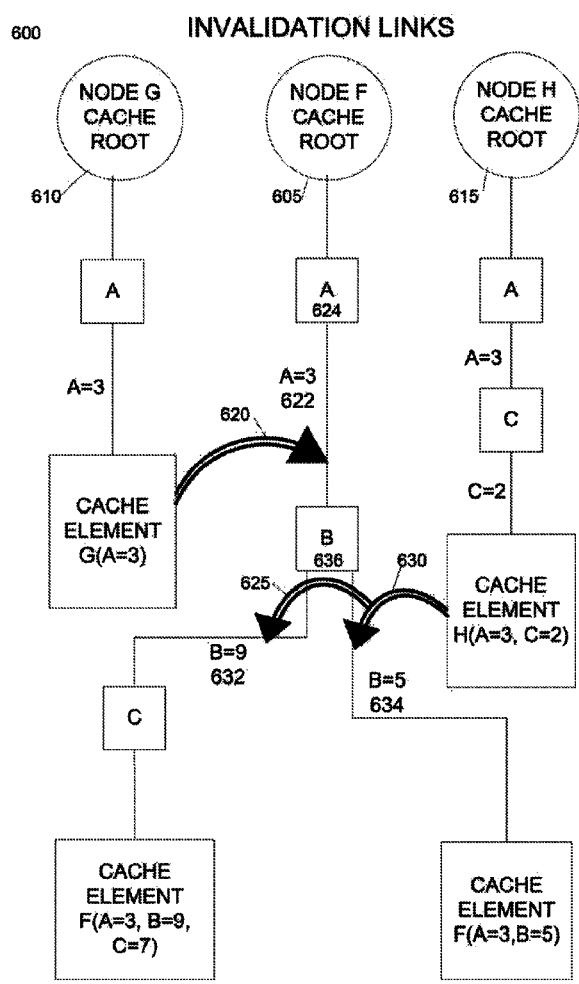
FIG. 6 illustrates example invalidation links used to invalidate portions of cache trees due to changes in computation nodes according to an embodiment of the invention.

In an embodiment, cache trees and their cache elements may be partially or completely invalidated when computation nodes are modified. FIG. 6 illustrates example invalidation links used to invalidate portions of cache trees due to changes in computation nodes according to an embodiment of the invention. FIG. 6 illustrates a set 600 of cache trees 605, 610, and 615. Each of the example cache trees is associated with a computation node. In an embodiment, invalidation links, indicated by double arrows, are connected between the cache trees 605, 610, and 615. Each invalidation link indicate portions of a first computation node's cache tree that will be invalid if a second computation node is changed. For example, if code or instructions of computation node G is modified, cache tree 610 will be invalid. Additionally, the invalidation link 620 indicates that everything in computation node F's cache tree 605 below link 622 will be invalid if the code of computation node G is modified. However, cache parameter element 624 and link 622 will still be valid. Regardless of how computation node G is modified, computation node F will still be dependent at least in part on parameter A=3. Additionally, the cache tree 615, associated with computation node H, will not be affected by changes to computation node G, as there are no invalidation links between cache trees 610 and 615.

Similarly, if computation node H is modified, an embodiment of the invention will invalidate cache tree 615. Invalidation links 625 and 630 will invalidate the portions of cache tree 605 below links 632 and 634. However, cache parameter elements 624 and 636 will remain in the cache tree 605, indicating that computation node F is dependent on parameters A and B regardless of any changes to computation node H.

In an embodiment, a programmer or other user can manually designate computation nodes as invalid following any changes. In another embodiment, the compilation of a changed computation node automatically invalidates its cache tree and other computation nodes' cache trees (or portions thereof) as specified by invalidation links. In still another embodiment, a version control system using time stamps, hashes, or any other change detecting technique can be used to automatically detect invalid cache trees.

In an embodiment, when all or a portion of a cache tree is invalidated, the invalid portion is deleted or deallocated from memory. Another embodiment invalidates all or a portion of a cache tree by marking or setting indicators for the invalid portions of the cache tree. An embodiment of the invention will ignore portions of the cache tree marked as invalid when evaluating the cache tree to determine if a previously determined output value of a computation node has been cached. However, when updating a cache tree, portions of a cache tree that were previously marked as invalid and matching the current parameter values can be recycled and marked as valid again. This embodiment minimizes the number of memory allocation and deallocation operations required when invalidating and then updating cache trees, thereby improving performance. When the control flow and/or order of parameter accesses in a new version of a computation node is unchanged from that in a previous version of the computation node, an embodiment of the invention will often be able to recycle some or all of the invalidated portions of the cache tree when updating the cache tree.

Figure 7A:
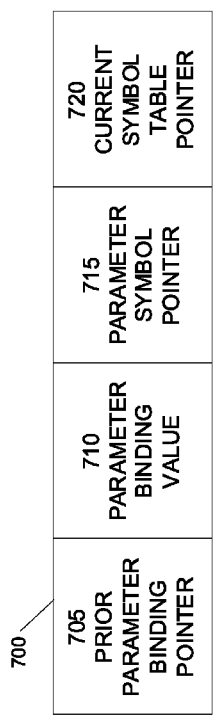
FIGS. 7A and 7B illustrate data structures suitable for creating cache trees for use with an embodiment of the invention.
Figure 7B:
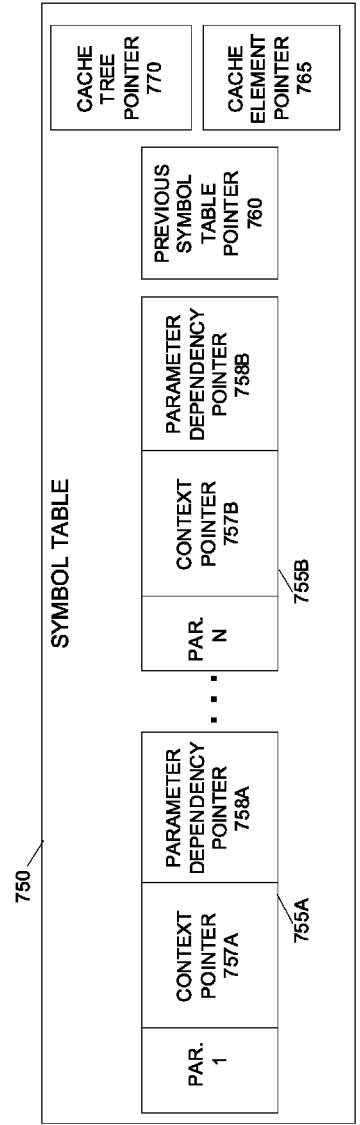

FIGS. 7A and 7B illustrate data structures suitable creating cache trees for use with an embodiment of the invention. An embodiment uses two types of data structures: context data structures and symbol table data structures. Embodiments of the invention use these data structures to determine the dynamic parameterizations and dynamic dependencies of computation nodes, to create and update cache trees for caching output values of computation nodes, and to create invalidation links between cache trees. These data structures and their usage are provided as an example and embodiments of the invention can use alternative data structures to implement methods 100 and 150.

FIG. 7A illustrates a context data structure 700 according to an embodiment of the invention. The context data structure 700 includes four elements in this embodiment: a prior parameter binding pointer 705, a parameter binding value 710, a parameter symbol pointer 715, and a current symbol table pointer 720. In other embodiments, the pointers 705, 715, and 720 can be replaced with any other data type that includes information referring to data stored elsewhere, such as a physical or virtual memory address; an index or key to an array or other collection of data objects; or a reference data type commonly used by managed programming languages.

The context data structure 700 is used to specify the bindings, or current values, of parameters used by computation nodes. Each instance of the context data structure may specify the binding of a value to a parameter. Because of dynamic scoping, the new value of a binding in a first computation node will apply in any computation nodes called by the first computation node. The prior parameter binding pointer 705 of the context data structure 700 references a previously created instance of a context data structure 700 that has a bound a different value to the parameter. If there are no previous bindings for a parameter, prior parameter binding pointer 705 may be set to null.

The parameter binding value 710 of context data structure 700 specifies the value being bound to a parameter. Current symbol table pointer 720 references an instance of a symbol table data structure associated with an instance of the context data structure 700. Parameter symbol pointer 715 references the parameter within the associated symbol table that is being bound by this context. As discussed in detail below, in an embodiment of the invention, some instances of context data structure 700 may leave the parameter binding value 710 and the parameter symbol pointer 715 set to null or otherwise undefined.

FIG. 7B illustrates a symbol table data structure 750 according to an embodiment of the invention. In an embodiment, each instance of a symbol table data structure 750 specifies the parameters defined in the initial state or one of the computation nodes called by the system. An embodiment of symbol table data structure 750 includes previous symbol table pointer 760, which references an instance of a symbol table data structure 750 associated with a previously called computation node that is caching its value (or the initial system state).

An embodiment of the symbol table data structure 750 also includes a cache element pointer 765 referencing an empty cache element adapted to store the output value of a computation node for the current parameter values. An embodiment of the symbol table data structure 750 includes a cache tree pointer 770 referencing a location in a cache tree associated with a computation node. Pointers 760, 765, and 770 may be set to null or left undefined for some instances of the symbol table data structure 750.

An embodiment of the symbol table data structure 750 is adapted to include or reference zero, one, or more parameter elements 755. Embodiments of the symbol table data structure 750 can use linked lists or other dynamic allocation techniques to include or reference any arbitrary integer number (N) of parameter elements 755. Each parameter element represents a parameter associated with the current state of the system. Example symbol table data structure 750 illustrates a first parameter element 755a, representing a first parameter, parameter 1, and another parameter element 755b, representing another parameter, parameter N.

An embodiment of the parameter elements 755 includes a pair of pointers: a context pointer 757 and a parameter dependency pointer 758. The context pointer 757 references the context data structure binding the parameter associated with the parameter element to its current value. The parameter dependency pointer 758 references a parameter element in a symbol table associated with previously called computation node.

FIGS. 8A-8L illustrate an example application of data structures 700 and 750 to determine the dynamic parameterizations and dynamic dependencies of computation nodes, to create and update cache trees for caching output values of computation nodes, and to create invalidation links between cache trees. This example application will illustrate the creation of cache trees for computation nodes when executing the example pseudocode of Table 2. Additional instructions for calculating results of the computation nodes that are not pertinent to caching have been omitted for clarity.

TABLE 2

Example Pseudocode for Figures 8A-8L

```
/*Initial State*/
parameter X = 2;
parameter Y = 3;
Node F {
   {
      set parameter X = 4;
      set parameter Z = 5;
      call node G( );
   }
   read parameter X;
   return result;
}
Node G {
   read parameter Y;
   read parameter X;
   return result;
}
```

Additionally, the arrangement of pointers and other data fields in the context and symbol table data structures in FIGS. 8A-8L corresponds with the arrangement shown in FIGS. 7A-7B. For example, the pointer shown on the left side of the context data structure 700 in FIG. 7A is the prior parameter binding pointer 705. Similarly, the leftmost pointer of any instance of a context data structure in FIGS. 8A-8L is also a prior binding pointer 705. Furthermore, pointers marked with "-" are set to null or another value indicating that they are undefined.

Figure 8A:
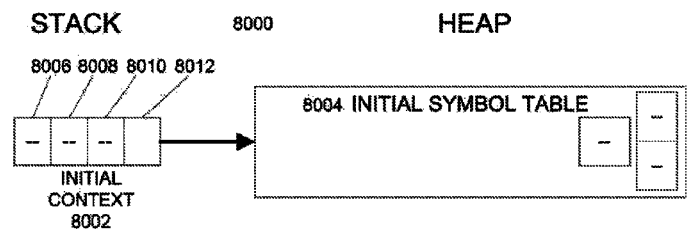
FIGS. 8A-8L illustrate the application of data structures to create example cache trees according to an embodiment of the invention.

FIG. 8A illustrates the set of data structures 8000 upon initializing an embodiment of the system. The set of data structures include an initial context data structure 8002 and an initial symbol table 8004. In an embodiment, context data structures are stored in a stack or other LIFO data structure and the symbol tables are stored in heap memory. The prior parameter binding pointer 8006, parameter binding value 8008, and parameter symbol pointer 8010 are set to null. The current symbol table pointer 8012 references initial symbol table 8004.

Figure 8B:
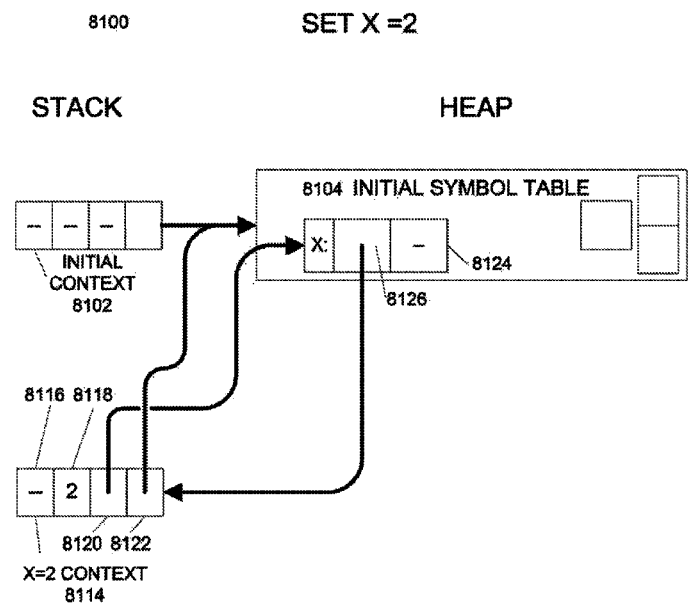

As shown in the pseudocode of Table 2, the system first sets parameter X=2. FIG. 8B illustrates the set of data structures 8100 upon setting parameter X=2 in the initial state of this example according to an embodiment of the system. In an embodiment, a new context data structure 8114, referred to as the "X=2 context," representing the parameter binding of X=2 is added to the stack. The initial context 8102 remains unchanged by the addition of the X=2 context 8114. The X=2 context 8114 has its parameter binding value 8118 set to 2. A parameter element 8124 is added to the initial symbol table 8104 to represent parameter X. The parameter symbol pointer 8120 of the X=2 context 8114 references parameter element 8124. The current symbol table pointer 8122 of context 8114 references the initial symbol table 8104. Similarly, the context pointer 8126 of parameter element 8124 references X=2 context 8114. Additionally, the prior parameter binding pointer 8116 of the X=2 context is set to null, as context 8114 is the first context to bind a value to parameter X.

Figure 8C:
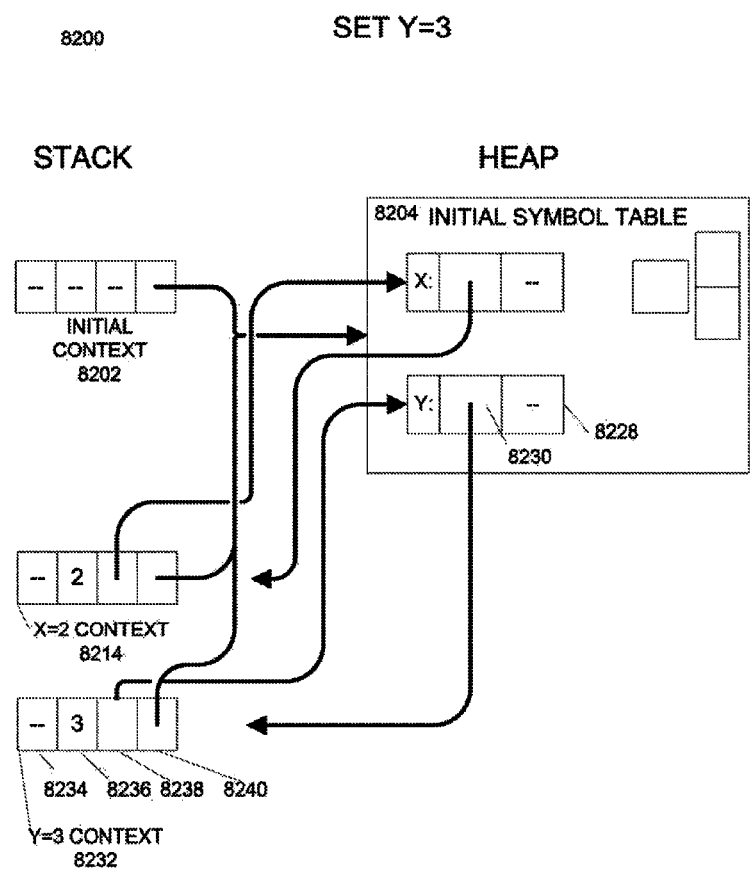

As shown in the pseudocode of Table 2, the system next sets parameter Y=3. FIG. 8C illustrates the set of data structures 8200 upon setting parameter Y=3 in the initial state of this example according to an embodiment of the system. A new context data structure 8232, referred to as the "Y=3 context," representing the parameter binding of Y=3 is added to the stack. The previous contexts 8202 and 8214 remains unchanged by the addition of the Y=3 context 8232. The Y=3 context 8232 has its parameter binding value 8236 set to 3. A parameter element 8228 is added to the initial symbol table 8204 to represent parameter Y. The parameter symbol pointer 8238 of the Y=3 context 8232 references parameter element 8228. The current symbol table pointer 8240 of context 8232 references the initial symbol table 8204. Similarly, the context pointer 8230 of parameter element 8228 references Y=3 context 8232. Additionally, the prior parameter binding pointer 8234 of the Y=3 context 8232 is set to null, as context 8232 is the first context to bind a value to parameter Y.

As shown in the pseudocode of Table 2, the system calls computation node F after setting the initial state. In this example, computation node F is specified as a computation node that caches its result values using an embodiment of the invention. In a further embodiment, some computation nodes may not be cached. Non-cached computation nodes can be specified by a programmer or other user or dynamically determined according to a caching strategy.

Figure 8D:
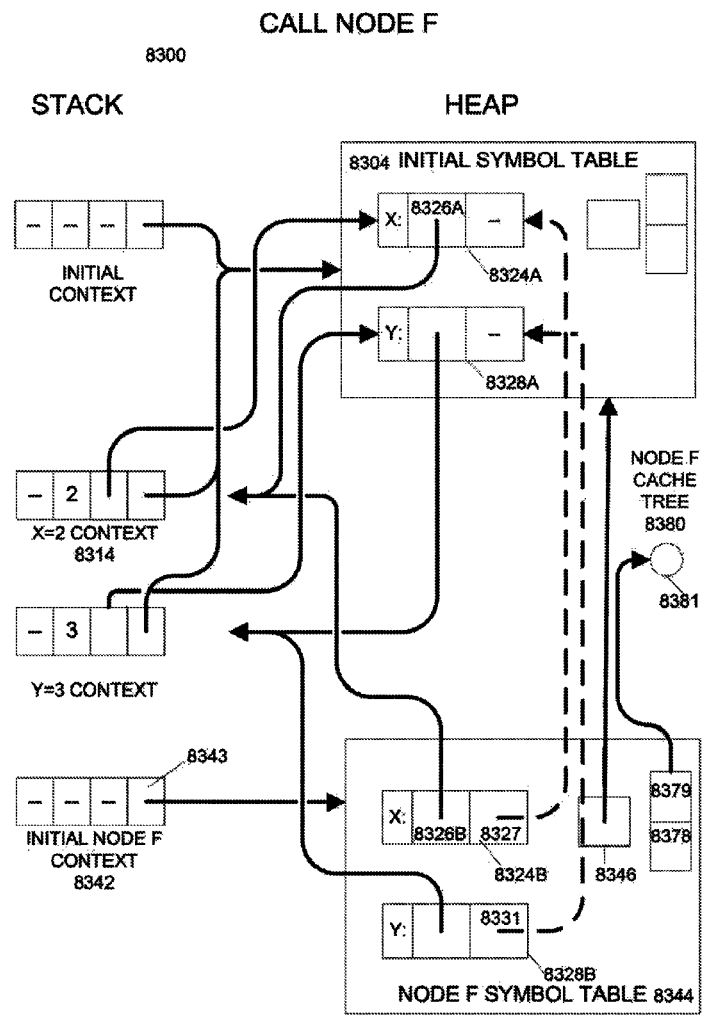

FIG. 8D illustrates the set of data structures 8300 upon calling computation node F in this example according to an embodiment of the system. An embodiment creates a new initial context and a new symbol table in response to the call of a computation node. In this example, an embodiment adds an initial node F context 8342 to the stack and creates a node F symbol table 8344. The initial node F context 8342 is initialized with a current symbol table pointer 8343 set to reference the node F symbol table 8344.

The node F symbol table 8344 is initialized as a copy of the previous symbol table, which in this example is symbol table 8304 associated with the initial state. The previous symbol table pointer 8346 of the node F symbol table 8344 is set to reference initial symbol table 8304. The parameter elements of the node F symbol table 8344 are similar to their counterparts in the initial symbol table 8304. Parameter element 8324b, representing parameter X in computation node F, is similar to parameter element 8324a, representing parameter X in the initial state. For example, context pointer 8326b of parameter element 8324b references the X=2 context 8314, similar to context pointer 8326a of parameter element 8324a. However, the parameter dependency pointer 8327 of parameter element 8324b is set to reference parameter element 8324a in the initial symbol table 8304. The parameter dependency pointer 8327 indicates that computation node F derives its current value of parameter X from a previous computation node or, in this example, from the initial state. As discussed in detail below, the parameter dependency pointer 8327 will be used to determine the dependency of computation nodes on parameters.

Similarly, parameter element 8328b, representing parameter Y in computation node F, is similar to parameter element 8328a, representing parameter X in the initial state. The parameter dependency pointer 8331 of parameter element 8328b is set to reference parameter element 8328a in the initial symbol table 8304, indicating that computation node F derives its current value of parameter Y from the initial state.

Additionally, an embodiment of the invention initializes a cache tree for computation node F, if computation node F does not already have an associated cache tree. An embodiment of the invention then sets the cache tree pointer of the computation node to reference the cache root of the newly initialized or previously created cache tree. In this example, the cache tree pointer 8379 of node F symbol table 8344 is set to the cache root 8381 of computation node F's cache tree 8380.

Additionally, an embodiment of the invention initializes the cache element pointer 8378 of the symbol table to reference an empty cache element adapted to store the output value of the computation node F for the current parameter values.

Figure 8E:
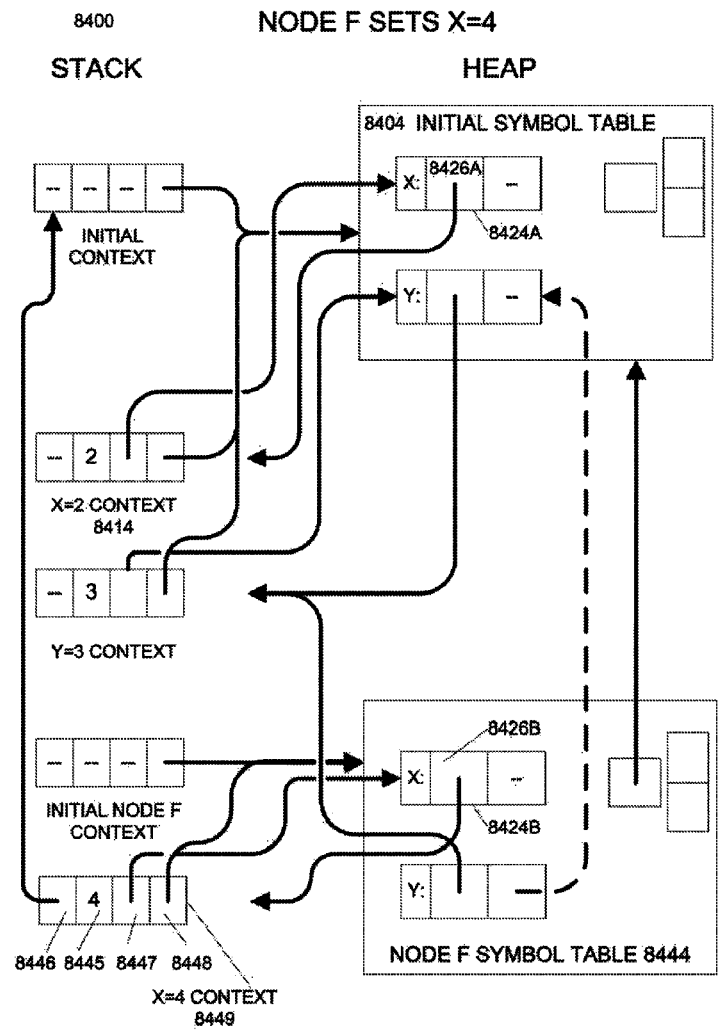

As shown in the pseudocode of Table 2, computation node F sets parameter X=4. FIG. 8E illustrates the set of data structures 8400 in this example after computation node F sets parameter X=4 according to an embodiment of the system. In an embodiment, a new context data structure 8449, referred to as the "X=4 context," representing the parameter binding of X=4 is added to the stack. The previous contexts remain unchanged by the addition of the X=4 context 8449. The X=4 context 8449 has its parameter binding value 8445 set to 4. The X=4 context 8449 has its parameter symbol pointer 8447 set to parameter element 8424b, which represents parameter X in the computation node F. The X=4 context 8449 also has its current symbol table pointer 8448 set to reference the Node F symbol table 8444.

The prior parameter binding pointer 8446 of the X=4 context 8449 is set to reference the previously defined X=2 context 8414, as context 8414 is the previous context binding a value to parameter X. In an embodiment, the prior parameter binding pointer 8446 in FIG. 8E is determined by the previous values of context pointer 8326b in parameter element 8324b of node symbol table 8344, as shown in FIG. 8D.

Additionally, the parameter element 8424b is updated so that its context pointer 8426b references newly added X=4 context 8449, instead of X=2 context 8414 as shown in FIG. 8D. However, context pointer 8426a of parameter 8424a in the initial symbol table 8404 remains set to reference the X=2 context 8414. When the computation exits the scope of the X=4 binding, the previous X=2 binding will be restored.

Figure 8F:
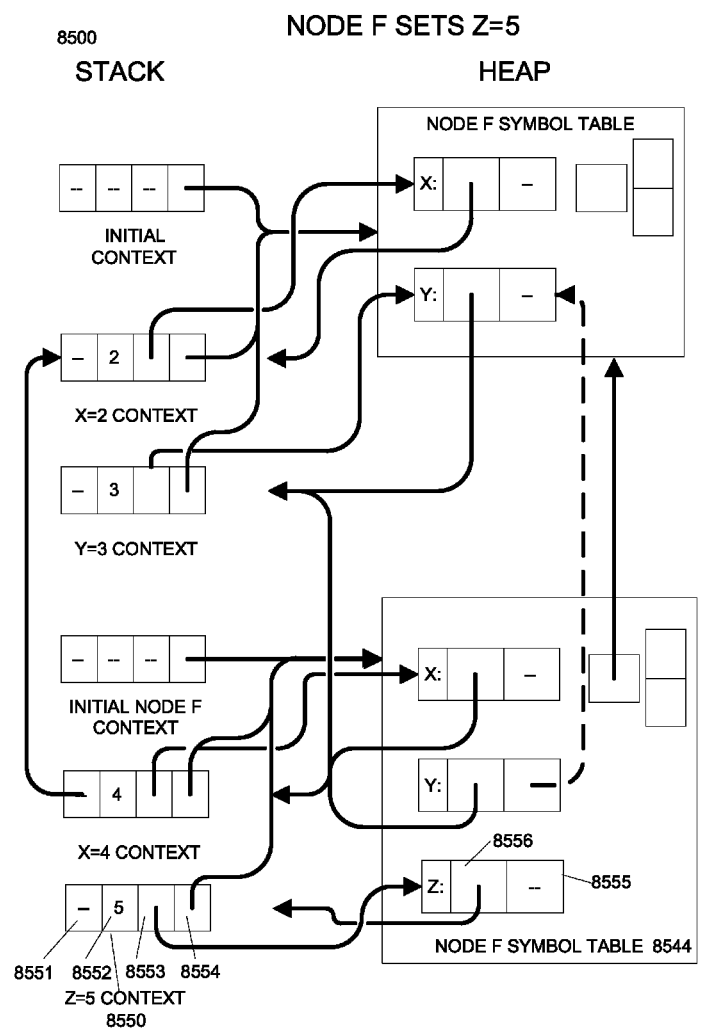

As shown in the pseudocode of Table 2, computation node F next defines a new parameter Z and sets parameter Z=5. FIG. 8F illustrates the example set of data structures 8500 upon defining parameter Z=5 in computation node F according to an embodiment of the system. A new context data structure 8550, referred to as the "Z=5 context," representing the parameter binding of Z=5 is added to the stack. The previous contexts remain unchanged by the addition of the Z=5 context 8550. The Z=5 context 8550 has its parameter binding value 8552 set to 5. A corresponding parameter element 8555 is added to the node F symbol table 8544 to represent parameter Z. The parameter symbol pointer 8553 of the Z=5 context 8550 references parameter element 8555. The current symbol table pointer 8554 of context 8550 references the node F symbol table 8544. Similarly, the context pointer 8556 of parameter element 8555 references the Z=5 context 8550. Additionally, the prior parameter binding pointer 8551 of the Z=5 context 8550 is set to null, as context 8550 is the first context to bind a value to parameter Z.

Figure 8G:
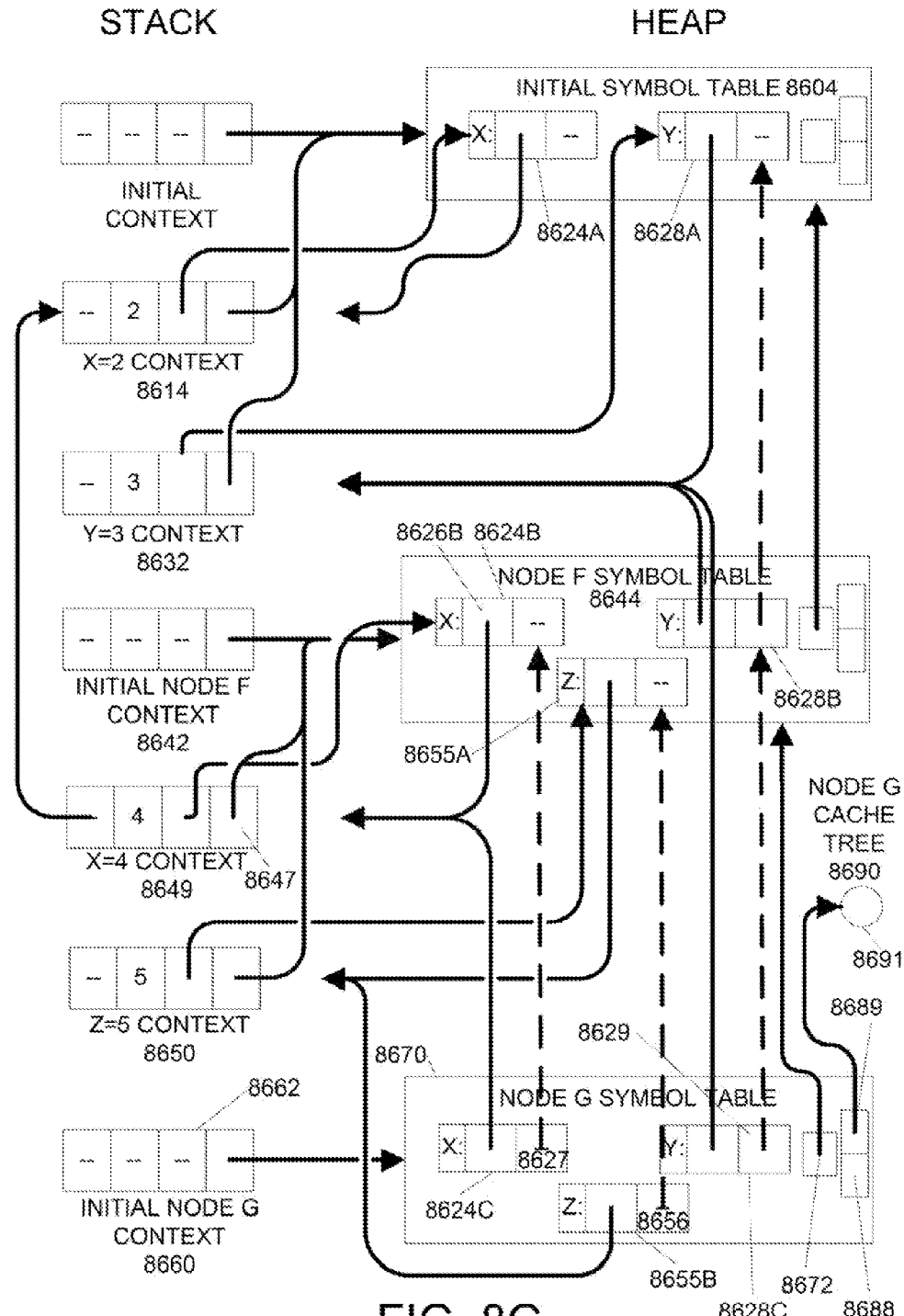

As shown in the pseudocode of Table 2, the system calls computation node G after setting parameter Z=5 in computation node F. FIG. 8G illustrates the set of data structures 8600 upon calling computation node G in this example according to an embodiment of the system. An embodiment creates a new initial context 8660 and a new symbol table 8670 for computation node G in response to the call of computation node G. The initial context 8660 of computation node G is initialized with a current symbol table pointer 8662 set to reference the node G symbol table 8670.

The node G symbol table 8670 is initialized as a copy of the previous symbol table, which in this example is symbol table 8644 associated with computation node F. The previous symbol table pointer 8672 of the node G symbol table 8670 is set to reference the node F symbol table 8644. The parameter elements of the node G symbol table 8670 are similar to their counterparts in the node F symbol table 8644. Parameter element 8624*c*, representing parameter X in computation node G, is similar to parameter element 8624*b*, representing parameter X in computation node F. Both of these parameter elements 8624*b* and 8624*c* reference the X=4 context 8649 previously defined. However, parameter element 8624*a* in the initial state symbol table 8604 still references the X=2 context 8614, because the X=4 binding in computation node F does not affect the initial state.

Similarly, parameter element 8628*c*, representing parameter Y in computation node G, is similar to parameter element 8628*b*, representing parameter Y in computation node F, and parameter element 8628*a*, representing parameter Y in the initial state. All of these parameter elements 8628*a*, 8628*b*, and 8628*c* have their respective context pointers set to reference the Y=3 context 8632. Parameter element 8655*b*, representing parameter Z in computation node G, is similar to parameter element 8655*a*, representing parameter Z in computation node F. Parameter elements 8655*a* and 8655*b* have their respective context pointers set to reference the Z=5 context 8650.

To indicate the dependency of parameters X, Y, and Z in computation node G on parameter elements defined in computation node F and the initial state, the parameter dependency pointers 8627, 8629, and 8656 in parameter elements 8624*c*, 8628*c*, and 8655*b* are set to reference parameter elements 8624*b*, 8628*b*, and 8655*a*, respectively, in the node F symbol table 8644.

Additionally, an embodiment of the invention initializes a cache tree for computation node G, if computation node G does not already have an associated cache tree. An embodiment of the invention then sets the cache tree pointer of the computation node to reference the cache root of the cache tree. In this example, the cache tree pointer 8689 of node G symbol table 8670 is set to the cache root 8691 of computation node G's cache tree 8690.

Additionally, an embodiment of the invention initializes the cache element pointer 8688 of the symbol table to reference an empty cache element adapted to store the output value of the computation node G for the current parameter values.

The set of data structures 8600 illustrate the state of an embodiment of an embodiment of the invention upon calling computation node G as shown in the example pseudocode of Table 2. At this point of the execution, none of the computation nodes have implicitly or explicitly read the values of any parameters. Thus, at this point of the execution of the example pseudocode, the computation nodes F and G are not dependent on or parameterized by any of the parameters.

FIGS. 8H-8L will show the use of the set of data structures 8600 to determine the dynamic parameterizations and dynamic dependencies of computation nodes, to create and update cache trees for caching output values of computation nodes, and to create invalidation links between cache trees.

As shown in the pseudocode of Table 2, the computation node G reads the value of parameter Y. As discussed above, the reading of a parameter value by a computation node indicates that the computation node is parameterized by that parameter. Thus, in this example, computation node G is parameterized by parameter Y.

Figure 8H:
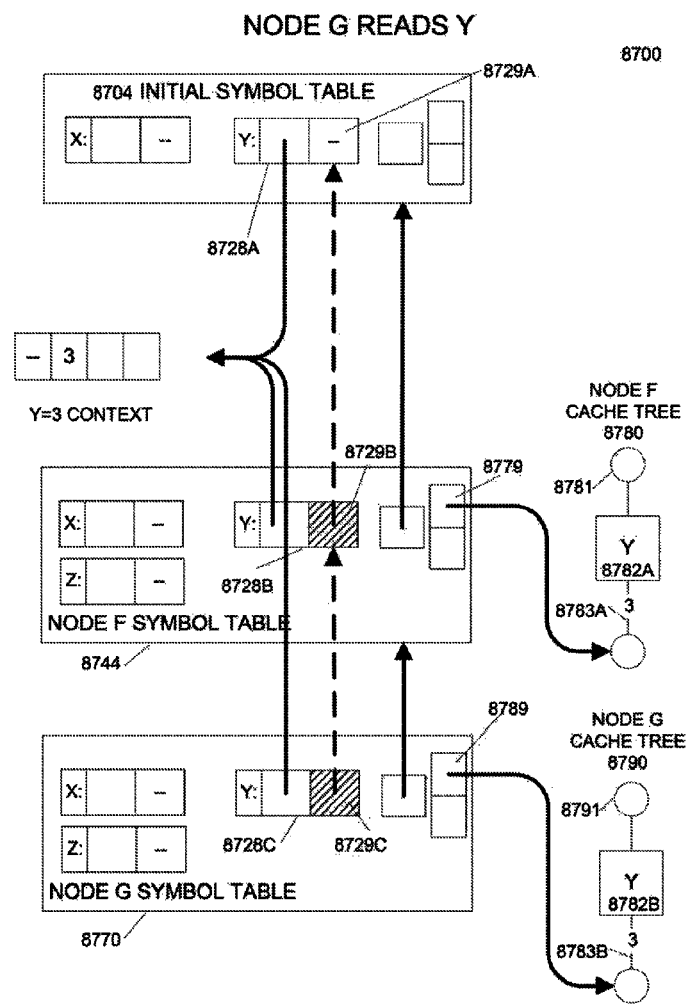

FIG. 8H illustrates the set of data structures 8700 upon computation node G reading parameter Y in this example according to an embodiment of the invention. The set of data structures 8700 is similar to set 8600, with the context data structures not pertinent to parameter Y omitted for clarity.

Upon reading a parameter in a computation node, an embodiment of the invention locates the corresponding parameter element in the symbol table associated with the computation node. An embodiment of the invention then follows the parameter dependency pointer of that parameter element to determine other computation nodes dependent upon this parameter.

In the current example, an embodiment of the invention locates the parameter element 8728*c* in node G symbol table 8770 that represents parameter Y. The parameter dependency pointer 8729*c* is followed to parameter element 8728*b* in the computation node F symbol table 8744. The parameter dependency pointer 8729*b* of parameter element 8728*b* is not set to null, indicating that the computation node F is dependent on the parameter binding Y=3. Additionally, the dependency pointer 8729*b* of parameter element 8728*b* is followed to parameter element 8728*a* in the initial state symbol table 8704. The dependency pointer 8729*a* of parameter element 8728*a* is set to null, indicating that there are no other computation nodes dependent on parameter Y when the parameter Y=3.

In an embodiment, as parameter dependency pointers such as 8729*b* and 8729*c* are followed, they are marked as processed. This is indicated in FIG. 8H by the shading of parameter dependency pointers 8729*c* and 8729*b*. In an embodiment, parameter dependency pointers that are marked as processed do not need to be evaluated again. Thus, if another computation node called by computation node F or G later reads parameter Y, parameter elements 8728*b* and 8728*c* do not need to be reevaluated.

For each computation node parameterized by the parameter read, an embodiment of the invention updates the cache trees associated with these computation nodes. In general, an embodiment of the invention updates a cache tree of a computation node by referencing the cache tree pointer of the computation node's symbol table. An embodiment of the invention adds a new cache parameter element to the cache tree at the location indicated by the cache tree pointer. An embodiment of the invention also adds a link representing the current parameter value to the cache tree. An embodiment of the invention then updates the cache tree pointer of the symbol table to reference this link.

If a cache parameter element already exists at the location in the cache tree specified by the cache tree pointer, then a new cache parameter element does not need to be added to the cache tree; however, a link representing the current parameter value of this parameter is added to the cache parameter element. For example, if a computation node is initially called with a parameter Y=3, a cache parameter element representing the parameter Y is added to the cache tree and a link representing the parameter value Y=3 is connected with this cache parameter element. If this computation node is later called with a different value of the Y parameter, such as Y=9, then an additional link representing the parameter value Y=9 is added to the previously created cache parameter element representing parameter Y. Regardless of whether a new cache parameter element is added to the cache tree or if a previously created cache parameter is updated with an additional link for the current parameter value, then the cache tree pointer is updated to reference the link representing the current value of this parameter.

In this example, the cache trees 8780 and 8790 of computation nodes F and G, respectively, are updated to include cache parameter elements 8782*a* and 8782*b* representing parameter Y. Additionally, cache parameter elements 8782*a* and 8782*b* are connected with links 8783*a* and 8783*b*, respectively, each representing the parameter value "Y=3" in their respective cache trees. The cache tree pointers 8779 and 8789 of the node F symbol table 8744 and the node G symbol table 8770 are updated to reference links 8783a and 8783b, respectively.

As shown in the pseudocode of Table 2, following the read of parameter Y, the computation node G reads the value of parameter X. Thus, in this example, computation node G is parameterized by parameter X.

Figure 8I:
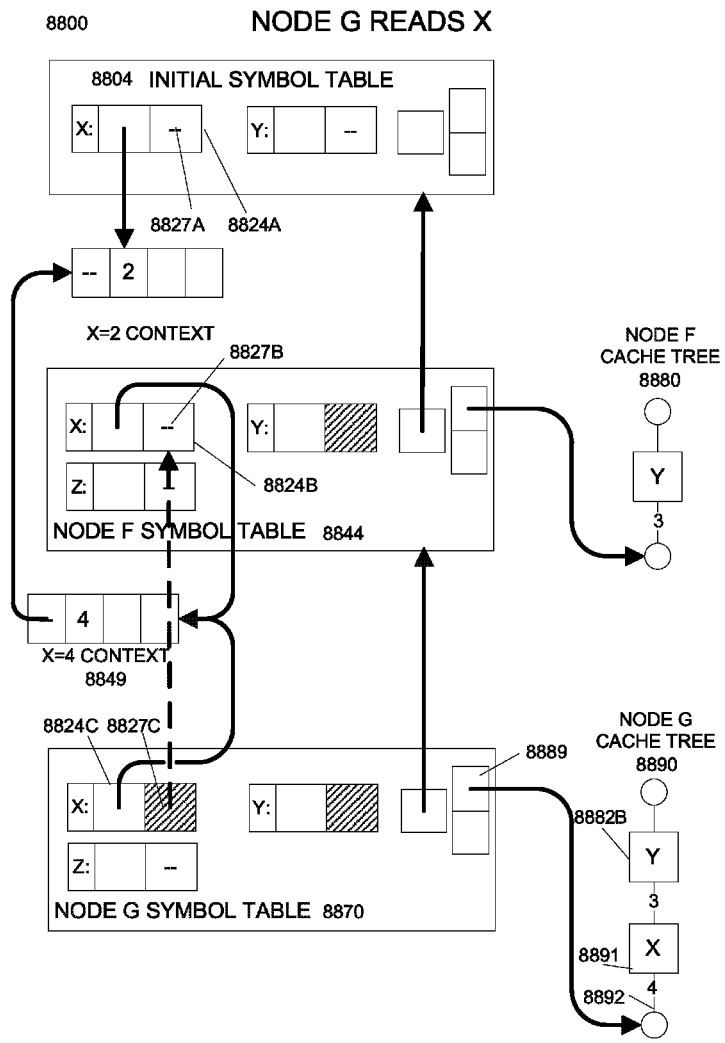

FIG. 8I illustrates the set of data structures 8800 upon computation node G reading parameter X in this example according to an embodiment of the invention. The set of data structures 8800 is similar to set 8600, with the context data structures not pertinent to parameter X omitted for clarity.

As discussed above, upon reading a parameter in a computation node, an embodiment of the invention locates the corresponding parameter element in the symbol table associated with the computation node. An embodiment of the invention then follows the parameter dependency pointer of that parameter element to determine other computation nodes dependent upon this parameter.

In the current example, an embodiment of the invention locates the parameter element 8824c in node G symbol table 8870 that represents parameter X. The parameter dependency pointer 8827c is followed to parameter element 8824b in the computation node F symbol table 8844. The parameter dependency pointer 8827b of parameter element 8824b is set to null, indicating that computation node F does not depend on the parameter binding X=4.

In an embodiment, as the parameter dependency pointer 8827c is followed, it is marked as processed and shaded in FIG. 8I accordingly. In an embodiment, parameter dependency pointers that are marked as processed do not need to be evaluated again. Thus, if another computation node called by computation node G later reads parameter X, parameter elements 8824b and 8824c do not need to be reevaluated.

For each computation node parameterized by the parameter read, an embodiment of the invention updates the cache trees associated with these computation nodes. In this example, the cache tree 8890 of computation node G is updated to include cache parameter element 8891 representing parameter X. Additionally, cache parameter element 8891 is connected with link 8892 representing the parameter value "X=4" in its respective cache tree. The cache tree pointer 8889 of the node G symbol table 8870 is updated to reference link 8892. The cache tree 8880 for computation node F is left unchanged from cache tree 8780 discussed above.

Figure 8J:
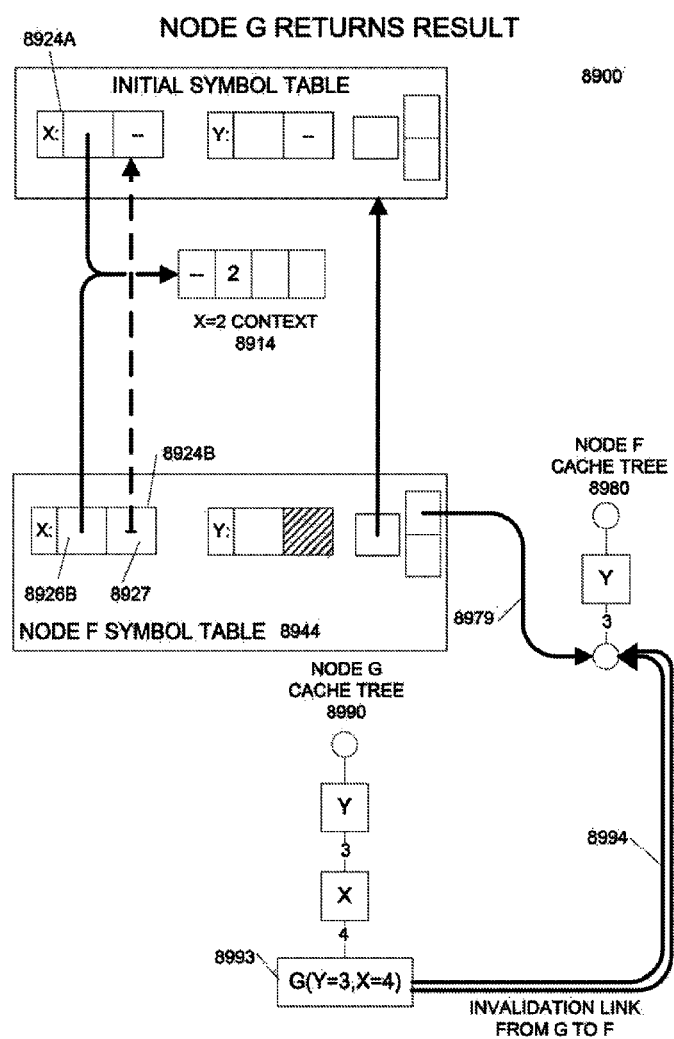

As shown in the pseudocode of Table 2, following the read of parameter X, the computation node G returns a result value to computation node F. FIG. 8J illustrates the set of data structures 8900 upon computation node G returning a result value to computation node F in this example according to an embodiment of the invention.

An embodiment stores the result value of computation node G for the current parameter values in cache element 8993 of cache tree 8990. Cache element 8993 is connected with the cache tree 8990 at the location specified by the cache tree pointer of computation node G's symbol table. Additionally, an invalidation link 8994 is created between the cache element 8993 and the location in computation node F's cache tree 8980 specified by the cache tree pointer 8979 in the computation node F symbol table 8944.

After storing the result value of the computation node in a cache element, an embodiment of the invention discards the symbol table for that computation node. For example, the computation node G symbol table 8870 is discarded after the result of computation node G is stored in cache element 8993.

Additionally, an embodiment of the invention pops or retrieves contexts previously stored on the stack and specifying the scope of parameter values in the completed computation node. These contexts are processed to restore the remaining symbol tables to their previous state prior to any associated parameter bindings. After processing, these contexts can be discarded. In an embodiment, contexts are retrieved from the stack until the initial context of the currently executing computation node is reached.

For example, following the execution of the computation node G, the contexts 8660, 8650, and 8649 shown in FIG. 8G are retrieved from the stack, processed to restore the parameters bindings affecting computation node F, and then discarded. This proceeds up to the initial computation node F context 8642.

For each context retrieved from the stack, an embodiment uses its symbol table pointer to locate and select the parameter element in the current computation node's symbol table. For example, an embodiment uses the symbol table pointer 8647 in context X=4 8649 to locate associated parameter element 8624b.

If the context's prior parameter binding pointer is null, then the parameter element referenced by this context is removed from the computation node's symbol table.

If the context's prior parameter binding pointer references another context on the stack defining a previous binding of the parameter, then an embodiment then sets the selected parameter element's context pointer equal to the context's prior parameter binding pointer. This ensures that the selected parameter element now references the context on the stack defining a previous binding of that parameter. This parameter binding defines the value of the parameter for the current computation node.

For example, parameter element 8624b has its context pointer 8626b modified so that instead of referencing X=4 context 8649, it instead references the X=2 context 8614. This is shown in FIG. 8J, with the parameter element 8924b in the computation node F symbol table 8944 having a context pointer 8926b referencing the X=2 context 8914.

Additionally, if the dependency pointer of a selected parameter element is not marked as processed and is set to null, then an embodiment of the invention also restores the value of the parameter dependency pointer of the parameter element. For example, parameter dependency pointer 8927 is set to reference parameter dependency element 8924a, indicating that the value of parameter X in computation node F depends on a parameter binding associated with the initial state.

Figure 8K:
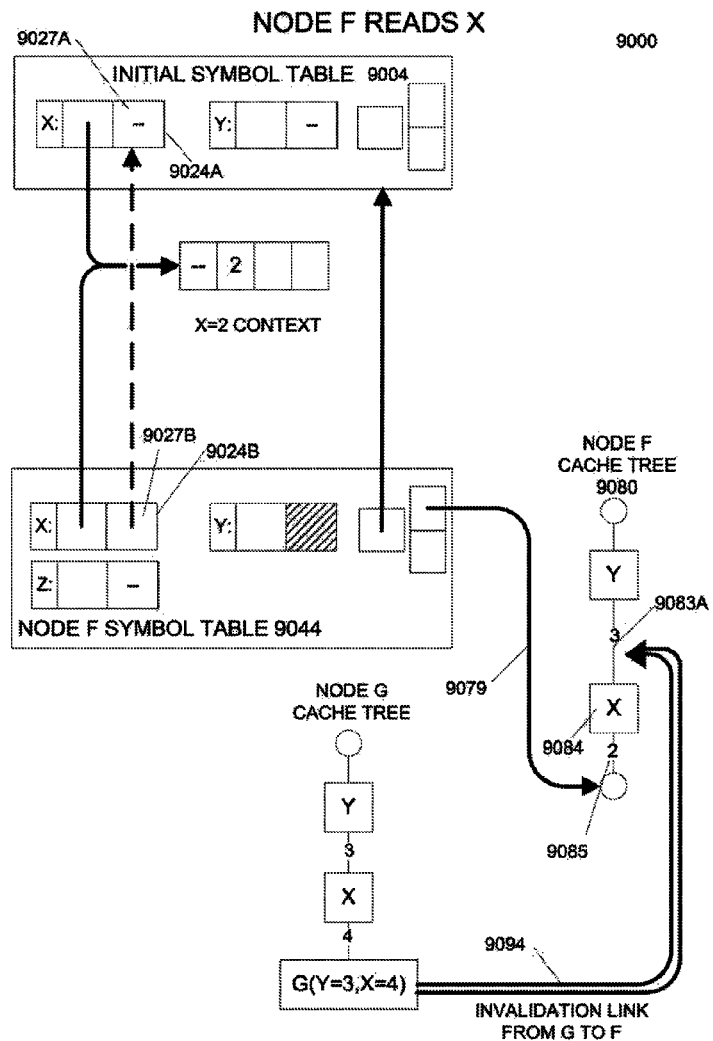

As shown in the pseudocode of Table 2, following the return to computation node F from computation node G, computation node F reads parameter X, which currently has a value of 2. FIG. 8K illustrates the set of data structures 9000 after computation node F reads parameter X in this example according to an embodiment of the invention. The set of data structures 9000 is similar to sets 8900 and 8300, with the context data structures not pertinent to parameter X omitted for clarity.

As discussed above, upon reading a parameter in a computation node, an embodiment of the invention locates the corresponding parameter element in the symbol table associated with the computation node. An embodiment of the invention then follows the parameter dependency pointer of that parameter element to determine other computation nodes dependent upon this parameter.

In the current example, an embodiment of the invention locates the parameter element 9024b in the node F symbol table 9044 that represents parameter X. The parameter dependency pointer 9027b is followed to parameter element 9024a in the initial symbol table 9004. The dependency pointer

9027a of parameter element 9024a is null, indicating that the current value of parameter X is defined in the initial state.

For each computation node parameterized by the parameter read, an embodiment of the invention updates the cache trees associated with these computation nodes. In this example, the cache tree 9080 of computation node F is updated to include cache parameter element 9084 representing parameter X. Additionally, cache parameter element 9084 is connected with link 9085 representing the parameter value "X=2" in cache tree 9080. Cache parameter element is added to the cache tree at the location specified by the previous value of the cache tree pointer 8979 of the node F symbol table 8994. The computation node F symbol table 9044 then updates the cache tree pointer 9079 to reference link 9085. The cache tree for computation node G is unchanged by this update.

Figure 8L:
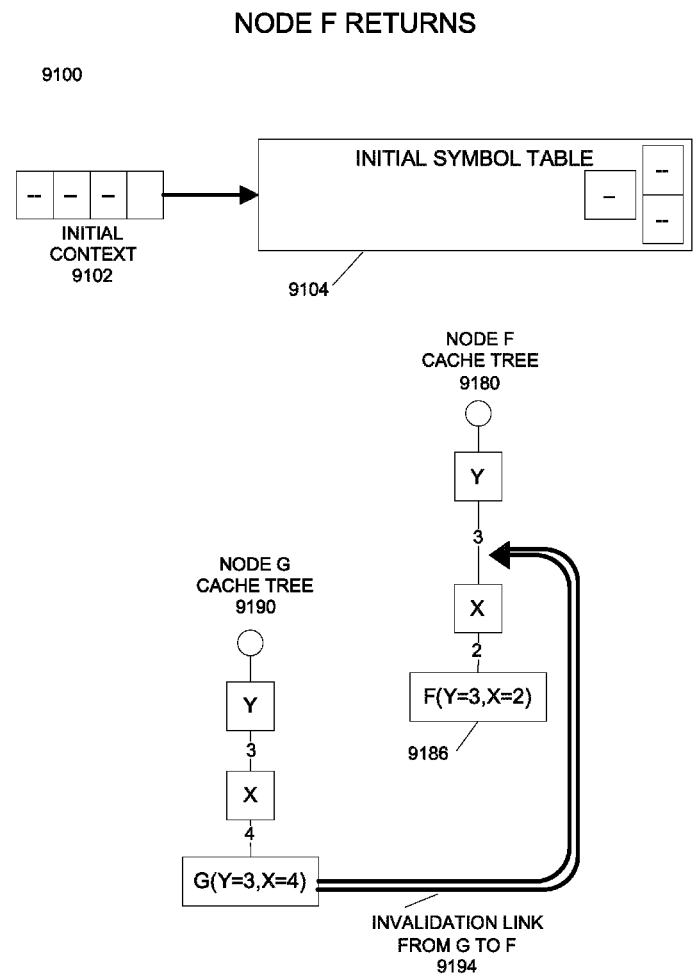

As shown in the pseudocode of Table 2, after computation node F reads parameter X, computation node F returns a result value. FIG. 8L illustrates the set of data structures 9100 after computation node F returns a result value in this example according to an embodiment of the system.

An embodiment stores the result value of computation node F for the current parameter values in cache element 9186 of cache tree 9180. Cache element 9186 is connected with the cache tree 9180 at the location specified by the cache tree pointer of computation node F's symbol table.

After storing the result value of the computation node in a cache element, an embodiment of the invention discards the symbol table for that computation node. For example, the computation node F symbol table 9044 is discarded after the result of computation node F is stored in cache element 9186.

As discussed above, an embodiment of the invention pops or retrieves contexts previously stored on the stack and specifying the scope of parameter values in the completed computation node. These contexts are processed to restore the remaining symbol tables to their previous state prior to any associated parameter bindings for any computation nodes that have not completed execution. After processing, these contexts can be discarded. In an embodiment, contexts are retrieved from the stack until the initial context of the currently executing computation node is reached.

In the present example, computation node F is last computation node to complete execution. After removing the contexts and parameter elements associated with the execution of computation nodes F and G, the set of data structures 9100 includes an initial context 9102 and an empty initial symbol table 9104, similar to the set of data structures 8000 discussed above. Additionally, the system is left with cache trees 9180 and 9190 and invalidation link 9194. As discussed above, cache trees 9180 and 9190 can be evaluated for subsequent executions of computation nodes F and G, either together or separately. For example, if a different computation node, computation node Q, calls computation node G, the cache tree 9190 can still be accessed to retrieve a previously stored result of computation node G. Additionally, as parameter values are changed, cache trees 9180 and 9190 can be augmented to include additional cached values of the computation nodes.

In general, embodiments of the invention are applicable to any type of application or system of computations involving networks of relatively computationally expensive operations, such as computer graphics and animations, scientific computing and visualizations, geospatial information system (GIS) applications. The following examples are intended to illustrate example applications of embodiments of the invention and are not intended to limit the usage of embodiments of the invention.

One example application of an embodiment of the invention is in the computation of articulated geometry in computer animation systems. Users of an animation system can describe how the surfaces of character models' geometry can transform, deform, warp or otherwise change in response to a potentially varied set of parameters. This may be done by authoring a hierarchy of procedural computational nodes (Actions) that are applied to compute the value of the 'points' attribute of the mesh.

In this example, each "Action" is a computational node with any number of "Attributes" that are parameters their computation. For example, a computational node may represent a "Scale" Action that scales points by the value of it's "scale factor" attribute.

Additionally, computational nodes may observe the values of attributes of other nodes in the scene as parameters to their computation. For example, a "FrameDeformation" computational node transforms points by the value of a 'transformMatrix' attribute parameter of another related node in the scene. Furthermore, the results of Action computational nodes may also be parameterized by 'weight' values associated with specific points.

An embodiment of the invention may cache output values of Action computational nodes based on the specific behavior of each Action computational node. As a result, the cached output values of one or a network of Action computational nodes is only dependent on the actual parameters used to determine the result, rather than the entire set of parameters provided to every node.

For example, the "Scale" Action computational node described above computes a resulting effect based on multiplying it's own "scale factor" attribute, with the associated "weight" attribute value. Because the Scale Action first observes the "weight" value, and only reads the "scale factor" attribute value and performs the resulting computation if the weight value is non-zero, the cached result of the "Scale" Action computational node, as well as the cached values of any other computational nodes dependent on this node will not depend on the "scale factor" parameter if the weight value is zero.

In another example, users of animation systems often animate, simulate, and/or render different elements of a scene independently and then combine or composite these elements into a final image. One way to specify how elements of a scene are composited is to specify a hierarchy of procedural process nodes that each compute a data asset, such as an image or other scene data. For example, process nodes may specify operations such as rendering data to create an image, resizing an image, modifying the color or transparency of an image, masking off a portion of an image, or compositing or combining two or more images in a specific order.

In this example, each process node may be a computational node having a number of input parameters to their computation. For example, an image resizing node may take 'width' and 'height' as input parameters. Additionally, nodes may read data previously computed by other nodes. For example, a "Compositing" node may take the output images of two or more other nodes as input to their computation.

As an example, a final image may be specified with the following process node hierarchy.

1. Composite "Final"
   1.A Composite "Foreground"
      1.A.1 Render "Character A"
      1.A.2 Render "Character B"
   1.B Render "Background"

In this example, the "Final" image is the composite of a "Foreground" image and a "Background" image. The "Foreground" image is dependent upon its own attributes as well as the "Character A" and "Character B" images. The "Character A", "Character B", and "Background" images depend only on their own attributes.

Applying an embodiment of the invention to this example, when the "Final" image result is computed for the first time with a first set of parameter values for all nodes, corresponding node caches are created to cache the outputs of each process node based on the parameters or attributes used by each node. If any of the parameter values are later changed, only the process nodes that depend (directly or indirectly) on this parameter need to be reevaluated.

For example, if one of the input parameters of the Render "Character A" process node is changed, then the "Final" image is recomputed by: recomputing the Render "Character A" node; recomputing the Composite "Foreground" node with the new results from the Render "Character A", and prior results from Render "Character B" node; and recomputing the Composite "Final" image node with new results from the Composite "Foreground" node and the prior results from Render "Background" node. In this example, the cached results of the render "Character B" node and the render "Background" node can be reused.

FIG. 9 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium including a set of instructions adapted to direct a computer to perform an operation comprising:
   receiving an indication that a first computation node having a first computation node cache has been modified;
   identifying a first invalidation link associated with the first computation node and a second computation node having a second computation node cache, wherein the first invalidation link identifies a first portion of the second computation node cache that is dependent on the first computation node;
   locating the first portion of the second computation node cache; and
   invalidating the first portion of the second computation node cache.

2. The computer-readable storage medium of claim 1, wherein the first invalidation link is determined dynamically from a previous execution of the first and second computation nodes.

3. The computer-readable storage medium of claim 1, wherein the operation further comprises:
   locating a second portion of the second computation node cache including at least one cache element adapted to store a first result value of the second computation node, wherein the first invalidation link indicates that the first result value is not dependent on the first computation node; and
   wherein invalidating the first portion of the second computation node cache comprises maintaining a current state of the second portion of the second computation node cache.

4. The computer-readable storage medium of claim 1, wherein the first portion of the second computation node cache includes at least one cache element adapted to store a first result value of the second computation node, wherein the first result value is determined at least in part by a call to the first computation node.

5. The computer-readable storage medium of claim 1, wherein invalidating at least the first portion of the second computation node cache includes deleting the first portion of the second computation node cache.

6. The computer-readable storage medium of claim 1, wherein invalidating at least the first portion of the second computation node cache includes marking the first portion of the second computation node cache with an invalid indicator.

7. The computer-readable storage medium of claim 6, wherein the operation further comprises:
   receiving a call to the second computation node;
   executing the second computation node up to a call to the first computation node;
   executing the first computation node up to a first instruction accessing a first parameter having a first parameter value;
   updating the first computation node cache such that the first computation node cache includes a first reference to the first parameter and the first parameter value accessed by the first instruction; and
   updating the second computation node cache such that the second computation node cache includes a second reference to the first parameter and the first parameter value accessed by the first instruction.

8. The computer-readable storage medium of claim 7, wherein updating the second computation node cache includes:
- determining if at least part of the first portion of the second computation node cache marked with the invalid indicator corresponds with the second reference to the first parameter and the first parameter value; and
- removing the invalid indicator from the part of the first portion of the second computation node cache in response to the determination that the part of the first portion corresponds with the second reference to the first parameter and the first parameter value.

9. The computer-readable storage medium of claim 7, wherein updating the second computation node cache includes:
- creating a second invalidation link associated with the first computation node cache and the second computation node cache, wherein the second invalidation link specifies a second portion of the second computation node cache dependent on the first computation node.

10. The computer-readable storage medium of claim 9, wherein the second invalidation link is associated with the second reference to the first parameter and the first parameter value to specify the second portion of the second computation node cache.

11. The computer-readable storage medium of claim 8, wherein receiving an indication that the first computation node has been modified includes:
- receiving the indication from a user that the first computation node has been modified.

12. The computer-readable storage medium of claim 8, wherein receiving an indication that the first computation node has been modified includes:
- monitoring the first computation node for modifications; and
- setting the indication that the first computation node has been modified in response to the determination that the first computation node has been modified.

13. The computer-readable storage medium of claim 1, wherein the first computation node is associated with a first function and the second computation node is associated with a second function.

14. A computer-implemented method comprising:
- receiving an indication that a first computation node having a first computation node cache has been modified;
- identifying a first invalidation link associated with the first computation node and a second computation node having a second computation node cache, wherein the first invalidation link identifies a first portion of the second computation node cache that is dependent on the first computation node;
- locating the first portion of the second computation node cache; and
- invalidating, via a processor, the first portion of the second computation node cache.

15. The computer-implemented method of claim 14, wherein the first invalidation link is determined dynamically from a previous execution of the first and second computation nodes.

16. The computer-implemented method of claim 14, further comprising:
- locating a second portion of the second computation node cache including at least one cache element adapted to store a first result value of the second computation node, wherein the first invalidation link indicates that the first result value is not dependent on the first computation node; and
- wherein invalidating the first portion of the second computation node cache comprises maintaining a current state of the second portion of the second computation node cache.

17. The computer-implemented method of claim 14, wherein the first portion of the second computation node cache includes at least one cache element adapted to store a first result value of the second computation node, wherein the first result value is determined at least in part by a call to the first computation node.

18. The computer-implemented method of claim 14, wherein invalidating at least the first portion of the second computation node cache includes deleting the first portion of the second computation node cache.

19. The computer-implemented method of claim 14, wherein invalidating at least the first portion of the second computation node cache includes marking the first portion of the second computation node cache with an invalid indicator.

20. The computer-implemented method of claim 19, further comprising:
- receiving a call to the second computation node;
- executing the second computation node up to a call to the first computation node;
- executing the first computation node up to a first instruction accessing a first parameter having a first parameter value;
- updating the first computation node cache such that the first computation node cache includes a first reference to the first parameter and the first parameter value accessed by the first instruction; and
- updating the second computation node cache such that the second computation node cache includes a second reference to the first parameter and the first parameter value accessed by the first instruction.

21. The computer-implemented method of claim 20, wherein updating the second computation node cache includes:
- determining if at least part of the first portion of the second computation node cache marked with the invalid indicator corresponds with the second reference to the first parameter and the first parameter value; and
- removing the invalid indicator from the part of the first portion of the second computation node cache in response to the determination that the part of the first portion corresponds with the second reference to the first parameter and the first parameter value.

22. The computer-implemented method of claim 20, wherein updating the second computation node cache includes:
- creating a second invalidation link associated with the first computation node cache and the second computation node cache, wherein the second invalidation link specifies a second portion of the second computation node cache dependent on the first computation node.

23. The computer-implemented method of claim 22, wherein the second invalidation link is associated with the second reference to the first parameter and the first parameter value to specify the second portion of the second computation node cache.

24. The computer-implemented method of claim 21, wherein receiving an indication that the first computation node has been modified includes:
- receiving the indication from a user that the first computation node has been modified.

25. The computer-implemented method of claim 21, wherein receiving an indication that the first computation node has been modified includes:

monitoring the first computation node for modifications; and setting the indication that the first computation node has been modified in response to the determination that the first computation node has been modified.

26. The computer-implemented method of claim 14, wherein the first computation node is associated with a first function and the second computation node is associated with a second function.

* * * * *